US012699873B2

(12) United States Patent
Patel

(10) Patent No.: US 12,699,873 B2
(45) Date of Patent: Aug. 4, 2026

(54) NEURAL NETWORK PROCESSING USING MIXED-PRECISION DATA REPRESENTATION

(71) Applicant: MIPS Tech, LLC, San Jose, CA (US)

(72) Inventor: Sanjay Patel, San Ramon, CA (US)

(73) Assignee: MIPS Tech, LLC, San Jose, CA (US)

( * ) Notice: Subject to any disclaimer, the term of this patent is extended or adjusted under 35 U.S.C. 154(b) by 939 days.

(21) Appl. No.: 16/778,258

(22) Filed: Jan. 31, 2020

(65) Prior Publication Data

US 2020/0202195 A1     Jun. 25, 2020

Related U.S. Application Data

(63) Continuation-in-part of application No. 16/704,263, filed on Dec. 5, 2019.

(Continued)

(51) Int. Cl.
*G06N 3/04* (2023.01)
*G06F 7/485* (2006.01)
(Continued)

(52) U.S. Cl.
CPC .............. *G06N 3/04* (2013.01); *G06F 7/485* (2013.01); *G06F 17/16* (2013.01); *G06N 3/08* (2013.01)

(58) Field of Classification Search
CPC .. G06N 3/04; G06N 3/08; G06F 7/485; G06F 17/16
See application file for complete search history.

(56) References Cited

U.S. PATENT DOCUMENTS 4,821,271 A     4/1989  Kini
5,142,631 A     8/1992  Murray
(Continued)

FOREIGN PATENT DOCUMENTS

DE     102009000045 A1     7/2010
JP         2005165961 A     6/2005
(Continued)

OTHER PUBLICATIONS

Collins et al., "Pointer Cache Assisted Prefetching," In Proceedings of the 35th Annual International Symposium on Microarchitecture (MICRO-35), Nov. 2002, 12 pages.
(Continued)

*Primary Examiner* — Li B. Zhen
*Assistant Examiner* — Tirumale K Ramesh
(74) *Attorney, Agent, or Firm* — David Cain; Hoffman Warnick LLC

(57) ABSTRACT

Techniques for neural network processing using mixed-precision data representation are disclosed. Access to a processor that supports single-precision operations is obtained, where the processor is used for neural network calculations. A first input data element and a second input data element are presented for manipulation on the processor, where the manipulation supports the neural network calculations. The first input data element is manipulated with the second input data element using the processor, where the first input data element comprises a 16-bit reduced floating point representation. A result of the manipulation is output, where the result comprises a single-precision data representation element. The result is forwarded to a next layer of the neural network, based on the outputting.

21 Claims, 11 Drawing Sheets

Related U.S. Application Data

(60) Provisional application No. 62/883,155, filed on Aug. 6, 2019, provisional application No. 62/867,966, filed on Jun. 28, 2019, provisional application No. 62/800,431, filed on Feb. 2, 2019, provisional application No. 62/791,788, filed on Jan. 12, 2019, provisional application No. 62/776,032, filed on Dec. 6, 2018.

(51) Int. Cl.
| | |
|---|---|
| *G06F 17/16* | (2006.01) |
| *G06N 3/08* | (2023.01) |

(56) References Cited

U.S. PATENT DOCUMENTS

| | | | | |
|---|---|---|---|---|
| 5,218,564 | A | 6/1993 | Kevin | |
| 5,325,517 | A | 6/1994 | Baker | |
| 5,682,495 | A | 10/1997 | Beavers | |
| 5,931,959 | A | 8/1999 | Kwiat | |
| 6,134,605 | A | 10/2000 | Hudson | |
| 6,148,101 | A | 11/2000 | Tanaka | |
| 6,363,470 | B1 | 3/2002 | Laurenti | |
| 6,427,192 | B1 | 7/2002 | Roberts | |
| 6,578,094 | B1 | 6/2003 | Moudgill | |
| 6,820,213 | B1 | 11/2004 | Somers | |
| 6,823,446 | B1 | 11/2004 | Sinharoy | |
| 6,944,714 | B2 | 9/2005 | Lesarte | |
| 7,072,929 | B2 | 7/2006 | Pechanek | |
| 7,366,948 | B2 | 4/2008 | Michaelis | |
| 7,395,298 | B2 | 7/2008 | Debes | |
| 7,430,578 | B2 | 9/2008 | Debes | |
| 7,512,724 | B1 | 3/2009 | Dennis | |
| 7,558,939 | B2 | 7/2009 | Banerjee | |
| 7,610,473 | B2 | 10/2009 | Kissell | |
| 7,624,138 | B2 | 11/2009 | Debes | |
| 7,877,627 | B1 | 1/2011 | Freydel | |
| 8,314,636 | B2 | 11/2012 | Hutton | |
| 8,341,469 | B2 | 12/2012 | Miyama | |
| 8,493,974 | B1 | 7/2013 | Nelson | |
| 8,959,136 | B1 | 2/2015 | Cheung | |
| 9,086,906 | B2 | 7/2015 | Patel | |
| 9,104,473 | B2 | 8/2015 | Wegener | |
| 9,106,936 | B2 | 8/2015 | Wegener | |
| 9,235,510 | B2 | 1/2016 | Patel | |
| 9,423,999 | B1 | 8/2016 | Linzer | |
| 9,519,457 | B2 | 12/2016 | Shibayama | |
| 9,652,240 | B2 | 5/2017 | Jackson | |
| 9,792,123 | B2 | 10/2017 | Manoukian | |
| 9,830,275 | B2 | 11/2017 | Rozario | |
| 9,870,225 | B2 | 1/2018 | Sudhakar | |
| 9,977,720 | B2 | 5/2018 | Fujimoto | |
| 10,135,473 | B2 | 11/2018 | Fuchs | |
| 10,167,800 | B1 | 1/2019 | Chung | |
| 10,515,303 | B2 * | 12/2019 | Lie | G06F 9/30036 |
| 10,606,764 | B1 | 3/2020 | Kravit | |
| 10,705,848 | B2 | 7/2020 | Vougioukas | |
| 10,719,327 | B1 | 7/2020 | Al-Otoom | |
| 10,853,067 | B2 * | 12/2020 | Henry | G06F 9/30145 |
| 11,080,062 | B2 | 8/2021 | Pota | |
| 11,256,504 | B2 | 2/2022 | Madduri | |
| 11,443,013 | B2 | 9/2022 | Komuravelli | |
| 11,455,143 | B2 | 9/2022 | Ulrich | |
| 11,481,471 | B2 | 10/2022 | Nair | |
| 11,520,853 | B2 | 12/2022 | Nair | |
| 11,537,865 | B2 | 12/2022 | Nair | |
| 11,615,307 | B2 | 3/2023 | Robinson | |
| 11,635,963 | B2 | 4/2023 | Pota | |
| 11,645,178 | B2 | 5/2023 | Bemanian | |
| 11,829,764 | B2 | 11/2023 | Pota | |
| 11,893,470 | B2 | 2/2024 | Patel | |
| 12,001,953 | B2 | 6/2024 | Robinson | |
| 12,044,714 | B2 | 7/2024 | Petladwala | |
| 12,307,370 | B2 | 5/2025 | Robinson | |
| 12,327,170 | B2 | 6/2025 | Patel | |

| | | | | |
|---|---|---|---|---|
| 2002/0152419 | A1 | 10/2002 | McLoughlin | |
| 2002/0167337 | A1 | 11/2002 | Chelcea | |
| 2002/0169813 | A1 | 11/2002 | Pechanek | |
| 2003/0014597 | A1 | 1/2003 | van de Waerdt | |
| 2003/0018879 | A1 | 1/2003 | Sahraoui | |
| 2003/0061535 | A1 | 3/2003 | Bickel | |
| 2003/0161172 | A1 | 8/2003 | Civlin | |
| 2004/0073773 | A1 | 4/2004 | Demjanenko | |
| 2004/0117422 | A1 | 6/2004 | Debes | |
| 2004/0205409 | A1 | 10/2004 | Wu | |
| 2004/0215882 | A1 | 10/2004 | Alexander | |
| 2004/0255185 | A1 | 12/2004 | Fujiyama | |
| 2005/0125642 | A1 | 6/2005 | Kimura | |
| 2005/0132174 | A1 | 6/2005 | Jourdan | |
| 2005/0160228 | A1 | 7/2005 | Teruyama | |
| 2005/0198476 | A1 | 9/2005 | Gazsi | |
| 2005/0223172 | A1 | 10/2005 | Bortfeld | |
| 2006/0153185 | A1 | 7/2006 | Jain | |
| 2007/0133399 | A1 | 6/2007 | Gangwal | |
| 2007/0288776 | A1 | 12/2007 | DeMent | |
| 2008/0072024 | A1 | 3/2008 | Davis | |
| 2008/0168303 | A1 | 7/2008 | Spear | |
| 2008/0235491 | A1 | 9/2008 | Svec | |
| 2009/0089605 | A1 | 4/2009 | Westwick | |
| 2009/0282220 | A1 | 11/2009 | Norden | |
| 2010/0013517 | A1 | 1/2010 | Manohar | |
| 2010/0174448 | A1 | 7/2010 | Mueller | |
| 2010/0281448 | A1 | 11/2010 | He | |
| 2011/0153926 | A1 | 6/2011 | Fang | |
| 2011/0199117 | A1 | 8/2011 | Hutchings | |
| 2011/0296112 | A1 | 12/2011 | Li | |
| 2012/0079255 | A1 | 3/2012 | Combs | |
| 2012/0119781 | A1 | 5/2012 | Manohar | |
| 2012/0235839 | A1 | 9/2012 | Mazumdar | |
| 2012/0239908 | A1 | 9/2012 | Chen | |
| 2012/0303897 | A1 | 11/2012 | Pullagoundapatti | |
| 2012/0319730 | A1 | 12/2012 | Fitton | |
| 2013/0009666 | A1 | 1/2013 | Hutton | |
| 2013/0009667 | A1 | 1/2013 | Calhoun | |
| 2013/0043902 | A1 | 2/2013 | Rahim | |
| 2013/0159799 | A1 | 6/2013 | Brown | |
| 2013/0304991 | A1 | 11/2013 | Lothar | |
| 2014/0075144 | A1 | 3/2014 | Sanders | |
| 2014/0244987 | A1 | 8/2014 | Garbacea | |
| 2014/0250289 | A1 | 9/2014 | Pota | |
| 2014/0359350 | A1 | 12/2014 | Plank | |
| 2014/0372731 | A1 | 12/2014 | Nystad | |
| 2015/0123707 | A1 | 5/2015 | Nicol | |
| 2015/0347297 | A1 | 12/2015 | Hagersten | |
| 2016/0019158 | A1 | 1/2016 | Palacharla | |
| 2016/0321078 | A1 | 11/2016 | Bailey | |
| 2016/0328320 | A1 | 11/2016 | Dooley | |
| 2016/0328646 | A1 | 11/2016 | Lin | |
| 2017/0032285 | A1 | 2/2017 | Sharma | |
| 2017/0054449 | A1 | 2/2017 | Mani | |
| 2017/0061279 | A1 | 3/2017 | Yang | |
| 2017/0140263 | A1 | 5/2017 | Kaiser | |
| 2017/0372202 | A1 * | 12/2017 | Ginsburg | G06N 3/045 |
| 2018/0157465 | A1 | 6/2018 | Bittner | |
| 2018/0212632 | A1 | 7/2018 | Fuchs | |
| 2018/0285733 | A1 * | 10/2018 | Mellempudi | G06N 3/063 |
| 2018/0293076 | A1 | 10/2018 | Sadasivam | |
| 2018/0312193 | A1 | 11/2018 | Arnold | |
| 2018/0314940 | A1 | 11/2018 | Kundu | |
| 2018/0322382 | A1 | 11/2018 | Mellempudi | |
| 2018/0341486 | A1 | 11/2018 | Fowers | |
| 2019/0042244 | A1 | 2/2019 | Henry | |
| 2019/0171927 | A1 * | 6/2019 | Diril | G06N 3/08 |
| 2019/0188093 | A1 | 6/2019 | Eckelmann-Wendt | |
| 2019/0294413 | A1 | 9/2019 | Vantrease | |
| 2019/0332355 | A1 | 10/2019 | Tinker | |
| 2019/0361706 | A1 | 11/2019 | Vougioukas | |
| 2020/0013176 | A1 * | 1/2020 | Kang | G06T 7/593 |
| 2020/0042287 | A1 * | 2/2020 | Chalamalasetti | G06N 3/065 |
| 2020/0159534 | A1 * | 5/2020 | Li | G06N 3/063 |
| 2020/0192670 | A1 | 6/2020 | Gupta | |
| 2020/0202195 | A1 | 6/2020 | Patel | |
| 2021/0349690 | A1 | 11/2021 | Ulrich | |

(56)           References Cited

U.S. PATENT DOCUMENTS

FOREIGN PATENT DOCUMENTS

| JP | 2018133016 A | 8/2018 |
| WO | 2009131569 A1 | 10/2009 |
| WO | 2019002811 A1 | 1/2019 |
| WO | 2020118051 A1 | 6/2020 |
| WO | 2020146724 A1 | 7/2020 |
| WO | 2020234558 A1 | 11/2020 |

OTHER PUBLICATIONS

Courbariaux et al., "Training Deep Neural Networks With Low Precision Multiplications," Accepted as a workshop contribution at ICLR 2015, arXiv: 1412.7024v5 [cs.LG], Sep. 23, 2015, 10 pages.

Das et al., "Mixed Precision Training of Convolutional Neural Networks Using Integer Operations," Published as a conference paper at ICLR 2018, arXiv: 1802.00930v2 [cs:NE], Feb. 23, 2018, 11 pages.

Gupta et al., "Deep Learning with Limited Numerical Precision," Proceedings of the 32nd International Conference on Machine Learning, 2015, 10 pages.

Wikipedia's Interrupt historical version published Jul. 12, 2018 https://en.wikipedia.org/w/index.php?title=Interrupt&oldid=849930938 (Year: 2018), 9 pages.

Ioffe et al., "Batch Normalization: Accelerating Deep Network Training by Reducing Internal Covariate Shift," arXiv preprint arXiv: 1502.03167, Mar. 2, 2015, 11 pages.

Lai et al., "Deep Convolutional Neural Network Inference with Floating-point Weights and Fixed-point Activations," arXiv:1703. 03073v1 [cs.LG], Mar. 8, 2017, 10 pages.

Dipa RAO, Circular Buffering on TMS320C6000, Application Report SPRA645A, Texas Instruments Inc. (https://www.ti.com/lit/an/spra645a/spra645a.pdf?ts=1687998769026). Apr. 2001, 17 pages.

International Search Report and Written Opinion for corresponding International Application No. PCT/US2014/063591 dated Feb. 6, 2015, 10 pages.

Hongliang GAO, "Improving Branch Prediction Accuracy Via Effective Source Information And Prediction Algorithms," Electronic Theses and Dissertations 2008, URL: http://etd.fcla.edu/CF/CFE0002283/Gao_Hongliang_200808_PhD.pdf, XP055717421, 114 pages.

U.S. Appl. No. 16/522,429, Response to Examiner's Statement of Reasons for Allowance filed Apr. 3, 2023, 1 page.

U.S. Appl. No. 16/522,429, Amendment to Final Office Action filed Feb. 21, 2023, 13 pages.

U.S. Appl. No. 16/522,429, Amendment to Final Office Action filed Apr. 22, 2022, 10 pages.

U.S. Appl. No. 16/522,429, Amendment to Office Action filed Jul. 29, 2021, 7 pages.

U.S. Appl. No. 16/522,429, Amendment to Office Action filed Aug. 8, 2022, 11 pages.

U.S. Appl. No. 16/522,429, Final Office Action dated Sep. 3, 2021, 16 pages.

U.S. Appl. No. 16/522,429, Final Office Action dated Nov. 22, 2022, 18 pages.

U.S. Appl. No. 16/522,429, Notice of Allowance dated Mar. 20, 2023, 9 pages.

U.S. Appl. No. 16/522,429, Office Action dated May 12, 2021, 14 pages.

U.S. Appl. No. 16/522,429, Office Action dated May 17, 2022, 16 pages.

U.S. Appl. No. 16/522,429, Preliminary Amendment filed Jul. 25, 2019, 6 pages.

U.S. Appl. No. 16/704,263, Response to Examiner's Statement of Reasons for Allowance filed Dec. 13, 2023, 1 page.

U.S. Appl. No. 16/704,263, Amendment to Final Office Action with RCE filed Jun. 29, 2023, 11 pages.

U.S. Appl. No. 16/704,263, Amendment to Office Action filed Dec. 24, 2022, 9 pages.

U.S. Appl. No. 16/704,263, Final Office Action dated May 15, 2023, 10 pages.

U.S. Appl. No. 16/704,263, Notice of Allowance dated Sep. 14, 2023, 8 pages.

U.S. Appl. No. 16/704,263, Office Action dated Sep. 27, 2022, 18 pages.

U.S. Appl. No. 16/704,263, Preliminary Amendment filed Dec. 5, 2019, 6 pages.

U.S. Appl. No. 16/739,540, Notice of Allowance dated Mar. 31, 2021, 8 pages.

U.S. Appl. No. 16/985,307, Amendment to Office Action filed Jan. 13, 2023, 9 pages.

U.S. Appl. No. 16/985,307, Notice of Allowance dated Feb. 8, 2023, 8 pages.

U.S. Appl. No. 16/985,307, Office Action dated Oct. 14, 2022, 20 pages.

U.S. Appl. No. 16/985,307, Preliminary Amendment filed Aug. 5, 2020, 7 pages.

U.S. Appl. No. 17/364,718, 312 Amendment filed Mar. 9, 2023, 6 pages.

U.S. Appl. No. 17/364,718, Amendment to Office Action filed Sep. 20, 2022, 9 pages.

U.S. Appl. No. 17/364,718, Notice of Allowance dated Dec. 15, 2022, 12 pages.

U.S. Appl. No. 17/364,718, Office Action dated Jun. 24, 2022, 17 pages.

U.S. Appl. No. 18/114,044, Amendment to Final Office Action with RCE filed Feb. 22, 2024, 9 pages.

U.S. Appl. No. 18/114,044, Amendment to Office Action filed Sep. 29, 2023, 8 pages.

U.S. Appl. No. 18/114,044, Final Office Action dated Dec. 6, 2023, 19 pages.

U.S. Appl. No. 18/114,044, Notice of Allowance dated Mar. 14, 2024, 9 pages.

U.S. Appl. No. 18/114,044, Office Action dated Jul. 14, 2023, 25 pages.

U.S. Appl. No. 18/114,044, Preliminary Amendment filed Feb. 24, 2023, 7 pages.

U.S. Appl. No. 18/118,580, 312 Amendment filed Aug. 10, 2023, 2 pages.

U.S. Appl. No. 18/118,580, Notice of Allowance dated Jul. 13, 2023, 9 pages.

U.S. Appl. No. 18/118,580, Preliminary Amendment filed Mar. 7, 2023, 7 pages.

U.S. Appl. No. 18/540,669, 312 Amendment filed Apr. 24, 2025, 2 pages.

U.S. Appl. No. 18/540,669, Amendment to Office Action filed Feb. 19, 2025, 7 pages.

U.S. Appl. No. 18/540,669, Notice of Allowance dated Mar. 26, 2025, 5 pages.

U.S. Appl. No. 18/540,669, Office Action dated Nov. 21, 2024, 16 pages.

U.S. Appl. No. 18/540,669, Preliminary Amendment filed Dec. 14, 2023, 7 pages.

U.S. Appl. No. 18/650,612, Amendment to Office Action filed Jan. 27, 2025, 7 pages.

U.S. Appl. No. 18/650,612, Notice of Allowance dated Feb. 19, 2025, 8 pages.

U.S. Appl. No. 18/650,612, Office Action dated Nov. 13, 2024, 12 pages.

U.S. Appl. No. 18/650,612, Preliminary Amendment filed Apr. 30, 2024, 7 pages.

International Search Report for corresponding International Application No. PCT/US2019/064677 dated Apr. 9, 2020, 10 pages.

International Search Report for corresponding International Application No. PCT/US2020/013075 dated May 15, 2020, 9 pages.

International Preliminary Report on Patentability for corresponding International Application No. PCT/US2020/013075 dated Jun. 16, 2021, 7 pages.

International Preliminary Report on Patentability for corresponding International Application No. PCT/US2019/064677 dated Jun. 8, 2021, 8 pages.

(56)                    References Cited

OTHER PUBLICATIONS

Official Communication from German Patent Office in Application
No. DE 102013014169.9 (original and English translation dated
Jun. 29, 26), cited on an IDS filed in U.S. Appl. No. 16/704,263 on
Jul. 20, 2023 and considered by the Examiner on Sep. 06, 202, Copy
Unavailable.

\* cited by examiner

NEURAL NETWORK PROCESSING USING MIXED-PRECISION DATA REPRESENTATION

RELATED APPLICATIONS

This application claims the benefit of U.S. provisional patent applications "Neural Network Processing Using Mixed-Precision Data Representation" Ser. No. 62/800,431, filed Feb. 2, 2019, "Mixed-Precision Data Computation for Neural Network Reduction Operands" Ser. No. 62/867,966, filed Jun. 28, 2019, and "Neural Network Data Computation Using Mixed-Precision" Ser. No. 62/883,155, filed Aug. 6, 2019.

This application is also a continuation-in-part of U.S. patent application "Neural Network Processing Using Specialized Data Representation" Ser. No. 16/704,263, filed Dec. 5, 2019, which claims the benefit of U.S. provisional patent applications "Neural Network Processing Using Specialized Data Representation" Ser. No. 62/776,032, filed Dec. 6, 2018, "Address Manipulation Using Indices and Tags" Ser. No. 62/791,788, filed Jan. 12, 2019, "Neural Network Processing Using Mixed-Precision Data Representation" Ser. No. 62/800,431, filed Feb. 2, 2019, "Mixed-Precision Data Computation for Neural Network Reduction Operands" Ser. No. 62/867,966, filed Jun. 28, 2019, and "Neural Network Data Computation Using Mixed-Precision" Ser. No. 62/883,155, filed Aug. 6, 2019.

Each of the foregoing applications is hereby incorporated by reference in its entirety.

FIELD OF ART

This application relates generally to data manipulation and more particularly to neural network processing using mixed-precision data representation

BACKGROUND

Image data and other data from devices and device users are collected at an ever-increasing and astonishing pace. The collected data is harvested from devices including personal electronic devices, and from user activities such as online shopping and web surfing. Further data is collected from Internet of Things (IoT) devices, smart homes, and numerous additional sources. The collected data is collated and analyzed by academic researchers, commercial ventures, governments, and others for a wide range of purposes. The data is aggregated into immense datasets commonly referred to as "big data". The use of conventional processors and techniques to analyze this collected data is intractable as the computational requirements of the analysis far outstrip the capabilities of conventional processors and techniques. Additional data handling needs, including the capture, storage, maintenance, access, transmission, and visualization of the data, further complicate data analysis. These further data processing and handling requirements quickly saturate the storage and transfer or networking capabilities of the traditional systems. Tractable and scalable approaches to data processing and handling are demanded. Innovative hardware architectures and software techniques, algorithms, heuristics, and so on, are required. Users or owners of the datasets are intellectually or financially motivated to analyze the data contained therein. Further analysis computations and purposes include business analytics; disease detection, tracking, and control; crime detection and prevention; meteorology; and complex science and engineering simulations, to name only a very few. Predictive analytics are among the advanced data analysis techniques which are proving useful to the applications. Further approaches include the application of machine learning and deep learning techniques in support of the data analysis.

Neural networks are among the processing architectures that are favorable candidates for the data handling and processing tasks. The neural networks can be based on reconfigurable processor hardware, field programmable gate arrays, application specific gate arrays, and other configurable and reconfigurable architectures. Reconfigurable computing architectures can advantageously integrate many desirable characteristics of hardware and software techniques. A reconfigurable computing architecture can be "recoded" (reprogrammed) to adapt the architecture to a variety of computational approaches. Further, the reconfigurable architecture approaches can implement an underlying high-performance hardware architecture. Reconfigurable architectures may be arranged for applications that require high performance computing, then rearranged for the many other applications. Applications, including digital signal processing (DSP), medical image processing, machine learning, matrix computations, tensor computations, image data analysis, and so on, are successfully served by the capabilities of a reconfigurable architecture. The reconfigurable architecture is particularly well suited to data analysis when the data can include specific types of data, large quantities of unstructured data, sample data, and the like. The reconfigurable architecture can be configured to achieve these and other processing techniques.

SUMMARY

Image data can be processed for a wide range of purposes including media production, image processing, machine vision, and so on. The image data, such as 8-bit unsigned integer data or RGB image data, can be manipulated within a layer of a neural network. The neural network is particularly well suited to the processing of image data because the neural network can be trained. The training, which is based on using "known good" data, enables the neural network to classify objects, people, animals, etc. The neural network can learn as additional image data is provided. A neural network includes processors, where the processor can support single-precision operations. The input data, such as 8-bit unsigned integer image data, can be converted to a floating point representation. The floating point representation can include a reduced floating point representation. The reduced floating point representation can have the advantages of reduced storage and computation requirements, faster processing rates, faster convergence, and the like. In embodiments, the conversion of the image data to the reduced floating point representation can be accomplished without loss of precision. The converted input data can be manipulated with one or more reduced floating point data elements, where the data elements can be related to the neural network. The data elements can include neural network weights, biases, or activations. The manipulation can comprise a multiply and an add-accumulate operation. The manipulation can include a unary operation, a binary operation, or a conversion operation. The results of the manipulating are forwarded to a next layer within the neural network. The next layer can include a hidden layer, a convolutional layer, an activation layer, a bottleneck layer, or an output layer.

A processor-implemented method for data manipulation is disclosed comprising: obtaining access to a processor that supports single-precision operations, wherein the processor is used for neural network calculations; presenting a first input data element and a second input data element for manipulation on the processor, wherein the manipulation supports the neural network calculations; manipulating the first input data element with the second input data element using the processor, wherein the first input data element comprises a 16-bit reduced floating point representation; outputting a result of the manipulation, wherein the result comprises a single-precision data representation element; and forwarding the result to a next layer of the neural network, based on the outputting. In embodiments, the second input data element comprises a 16-bit reduced floating point representation. In embodiments, the second input data element comprises an 8-bit integer representation element. Some embodiments comprise factoring the 8-bit integer representation element into a 16-bit reduced floating point representation element to facilitate the manipulating. And in other embodiments, the 8-bit integer representation comprises image data, and the image data uses an 8-bit unsigned integer RGB representation.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
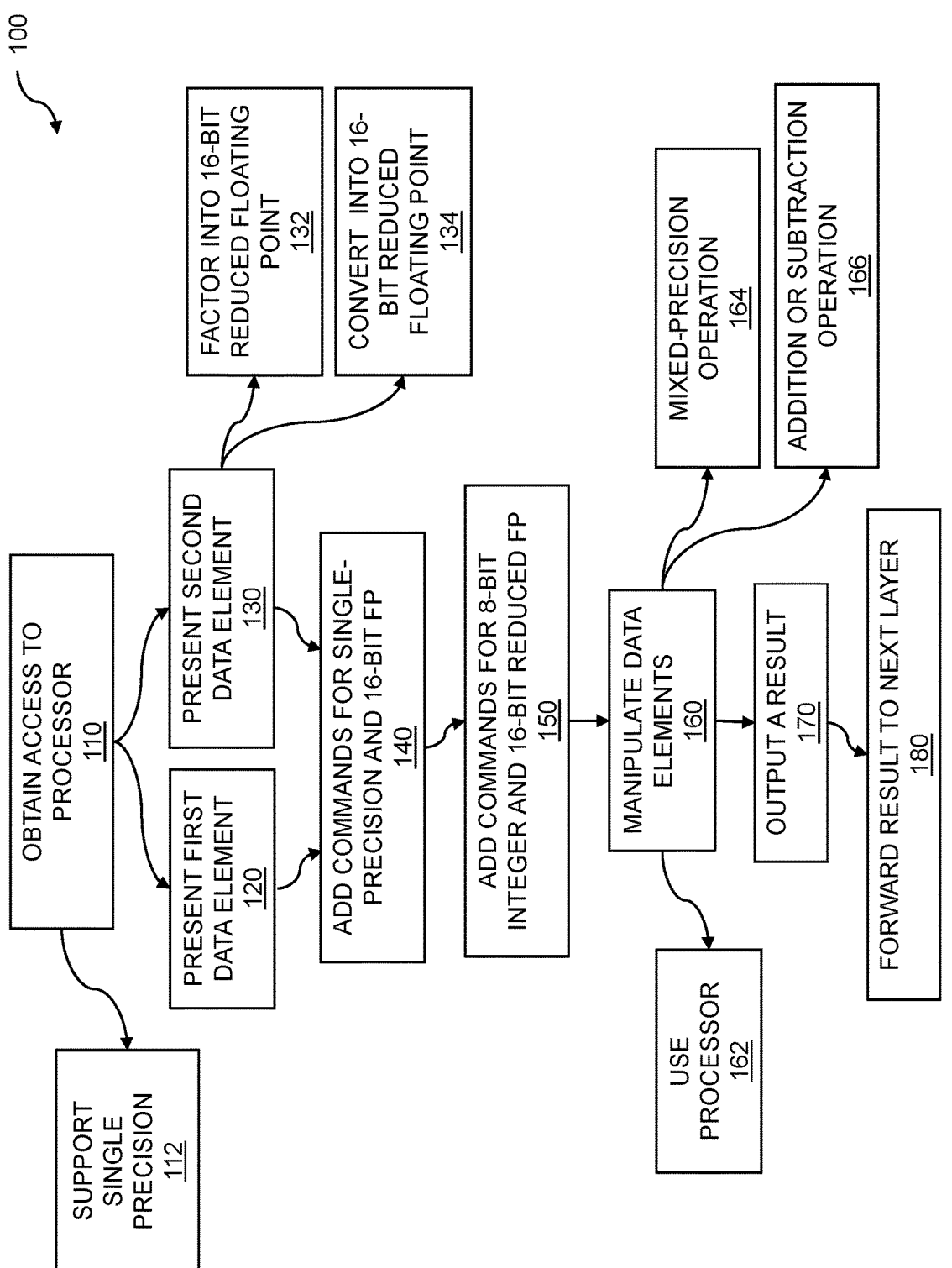
FIG. 1 is a flow diagram for neural network processing using mixed-precision data representation.

Neural network processing can be performed for data manipulation. A mixed-precision data representation can be chosen for use with a neural network to reduce computational complexity, to increase processing speed, to improve convergence, and so on. Neural networks can be applied to a wide variety of applications such as machine learning, image processing, medical diagnostics, and business analytics, among many others. Several techniques have been proposed for building neural networks. Common techniques include deep neural networks (DNNs), convolutional neural networks (CNNs), recurrent neural networks (RNNs), etc. The choice of technique for implementing a given neural network can be based on the type of data that will be processed by the neural network. In a usage example, a user may choose a convolutional neural network for processing image data. The CNN is configured to mimic the organization of the visual cortex of an animal such as a human. The CNN can be a good choice for image processing since the CNN can require minimal preprocessing of data prior to feeding the data to the CNN. The CNN can be shift invariant or space invariant.

Techniques are disclosed for neural network processing using mixed-precision data representation. The data representation can be used for integer data, single or double precision data, reduced-precision data, and so on. Access to a processor that supports single-precision operations is obtained, where the processor is used for neural network calculations. The neural network can include a deep neural network, a convolutional neural network, a recurrent neural network, etc. The processor can support single-precision operations or other precision operations. The processor can include a computing device, a server device, a processing device, and the like. The processor can be based on one or more processing elements within a reconfigurable fabric, a field programmable gate array, an application specific integrated circuit, etc. A first input data element and a second input data element are presented for manipulation on the processor, where the manipulation supports the neural network calculations. The neural network calculations can include addition, subtraction, dot product, convolution, and the like. The first input data element is manipulated with the second input data element using the processor, where the first input data element comprises a 16-bit reduced floating point representation. The reduced floating point representation can include an alternative single-precision data representation mode such as bfloat16. The bfloat16 representation comprises one sign bit, eight exponent bits, and seven explicit signific and bits. A total of eight precision bits (7+1) can be supported. The second input data element can include a 16-bit reduced floating point representation, an integer representation, a single-precision representation, etc. A result of the manipulation is output, where the result comprises a single-precision data representation element. The single-precision data representation element can include a binary 32 representation, a floating point 32 (fp32), and the like. The result is forwarded to a next layer of the neural network, based on the outputting. The next layer of the neural network can include a hidden layer, a convolution layer, a bottleneck layer, an output layer, an activation layer, etc.

FIG. 1 is a flow diagram for neural network processing using a mixed-precision data representation. A mixed-precision data representation can be used to facilitate neural network calculations by reducing neural network complexity, by accelerating data manipulation, etc. The data manipulation can be performed without loss of computational precision. The data manipulation is performed on a processor used for neural network calculations. The neural network can include a plurality of layers. A layer of the neural network can be implemented within a configurable hardware such as a field programmable gate array (FPGA), an application specific integrated circuit (ASIC), and so on. In embodiments, the layer of the neural network can include one or more elements within a reconfigurable fabric. The reconfigurable fabric can include a variety of elements. In embodiments, the elements within the reconfigurable fabric can include processing elements, switching elements, or storage elements. The elements of the reconfigurable fabric can be controlled. In embodiments, the elements within the reconfigurable fabric are controlled by one or more circular buffers. The elements of the reconfigurable fabric can be configured by coding, programming, scheduling, etc. In embodiments, the one or more circular buffers are statically scheduled.

The flow 100 includes obtaining access to a processor 110. The processor is used for neural network calculations. A neural network can comprise a plurality of layers, where the layers can include input layers, output layers, convolutional layers, hidden layers, bottleneck layers, and so on. Various techniques can be used to implement the neural network. In embodiments, the neural network can include a deep neural network (DNN), a convolutional neural network (CNN), a recurrent neural network (RNN), and the like. The processor that is obtained can support single-precision operations 112. The neural network calculations can include a variety of operations, where the operations can include logical operations, mathematical operations, matrix operations, tensor operations, and so on. The operations can include image processing operations. The flow 100 includes presenting a first input data element 120 and a second input data element 130 for manipulation on the processor, where the manipulation supports the neural network calculations. The first input data representation and the second input data representation can be based on one or more data representations. In embodiments, the data or numbering representations can include a signed or unsigned 8-bit integer representation; a reduced floating point representation such as bfloat16; a single-precision floating point representation such as binary32 or fp32; a double-precision floating point representation such as binary64; and so on. The particular representation used for a first input data element, a second input data element, or another input data element, can be chosen based on the type of data element such as an image data element, a neural network weight or bias, etc. In embodiments, the second input data element can include a 16-bit reduced floating point representation. The 16-bit reduced floating point representation can be based on various representations. In embodiments, the 16-bit reduced floating point representation comprises a bfloat16 data representation. The second input data element can include other representations. In embodiments, the second input data element can include an 8-bit integer representation element. The 8-bit integer representation element may be signed or unsigned. The first input data element or the second input data element can include further representations. In embodiments, the 16-bit reduced floating point representation is a data structure. The data structure can include data such as image data, RGB image data, etc. In other embodiments, the 16-bit reduced floating point representation comprises a reduced mantissa floating point representation. The reduced mantissa floating point representation can be determined by truncation, rounding, and the like.

The first input data element can be used for training the neural network, where the training can include adjusting weights, biases, activations, etc. In embodiments, the first input data element can include one or more neural network weights. The neural network can be trained in order to improve the efficacy of processing input data such as image data. In embodiments, the weights can be trained using single-precision data representations. Other data representations can also be used for the training of the weights. In embodiments, the first input data element comprises a neural network bias. The neural network bias can include a reduced-precision representation, a single-precision representation, etc. In further embodiments, the first input data element comprises a neural network activation. The neural network activation can include a rectified linear unit (ReLU) activation. The neural network, such as a DNN, CNN, RNN, etc., can be trained using a dataset of known values chosen for the training techniques. Neural network training based on bfloat16, binary32, or binary64, can be computationally intensive due to the processing overhead associated with computations based on floating point numbers. Once trained, the neural network can be used to process the input data and to make inferences based on the input data. Inferencing techniques are also computationally intensive when the computations are based on floating point numbering representations. Low precision computations can be used in place of the floating point computations. Low-precision inferencing can be based on 8-bit integer numbering representations, particularly when applied to inferencing based on a CNN. The 8-bit integer values can be manipulated with low computational overhead, permitting inferencing to be performed quickly.

Discussed throughout, data based on a numbering representation can be converted to data based on a second numbering representation. Data represented as an 8-bit unsigned integer can be converted to bfloat16, binary32, etc.; bfloat16 can be converted to binary32, binary64, or other numbering representations; etc. Operations that support either converting numbering representations or operating on operands based on different numbering representations can be included. In embodiments, a bfloat16 operand can be operated on using techniques similar to those used to operate on single-precision operands. The bfloat16 operand can be expanded to a single-precision representation. Operations based on single-precision representations can be executed. When the operations include training a neural network such as a CNN, then the weights, biases, etc., can be backpropagated to previous layers within the neural network. Other embodiments can include operations that include hybrid data type support. The hybrid data type can include single-precision values and low-precision or integer values. In embodiments, the hybrid data type support can include support for an 8-bit unsigned integer representation and a 16-bit reduced floating point representation. The operations can include matrix operations such as column major operations, row major operations, and the like.

To execute the various neural network calculations, an input data element can be converted, factored, translated, etc., to a different representation. Further embodiments include factoring the 8-bit integer representation element into a 16-bit reduced floating point representation element 132 to facilitate the manipulating. The factoring can be performed so that the first input data element and the second input data element are each based on the same representation. In some embodiments, the second input data element can include a single-precision data representation element. The single-precision data representation can include binary32 or fp32, etc. Further embodiments include converting the single-precision data representation element into a 16-bit reduced floating point data representation element 134 to facilitate the manipulation. The smaller size of the 16-bit reduced floating point representation can support faster neural network calculations by enabling use of processors comprising lower computation complexity.

The flow 100 further includes adding or including commands, for the processor, that support single-precision operands and 16-bit reduced floating point representation operands 140 in the same operation. The commands may directly support neural network calculations based on the mixed representations, may convert from one or more of the operands to a different representation before performing the calculation, and so on. Direct support of the neural network calculations may include truncation of the single-precision operation to a 16-bit reduced floating point representation. The flow 100 further includes adding or including commands for the processor that support 8-bit integer representation operands and 16-bit reduced floating point representation operands 150 in the same operation. The 8-bit integer operands can include signed or unsigned 8-bit integer operations. The 8-bit integer representation can include various types of data. In embodiments, the 8-bit integer representation comprises image data. Discussed previously, the image data can include gray-scale image data, color image data, etc. In embodiments, the image data can comprise an 8-bit unsigned integer red-green-blue RGB representation.

The flow 100 includes manipulating the first input data element with the second input data element 160. The manipulating of the first input data element with the second input data element is accomplished using the processor 162. The first input data element comprises a 16-bit reduced floating point representation. Noted throughout, a representation such as an 8-bit integer representation element can be factored into a 16-bit reduced floating point representation element to facilitate the manipulating. Similarly, other factoring, converting, and so on, can include converting a single-precision representation element to a 16-bit reduced floating point representation element, and the like. In embodiments, the manipulating can include a mixed-precision operation 164. The mixed-precision operation can be performed between two representations without first requiring conversion or translation of one or more elements to a common representation. The manipulating can include various neural network calculations. In embodiments, the manipulating can include neural network addition or subtraction operations 166. A neural network addition or subtraction may include a mixed precision operation. In embodiments, the addition or subtraction operations can include a single-precision data representation operand and a 16-bit reduced floating point data representation operand as inputs resulting in a single-precision data representation output. Other mixed-precisions can be used. The additions and subtractions can support more complex calculations. In embodiments, the addition or subtraction operations facilitate calculating a dot product. The dot product is based on calculating sums of products. As for other calculations, the dot product can include mixed precision calculations. In embodiments, the dot product can include an 8-bit integer data representation operand and a 16-bit reduced floating point data representation operand as inputs resulting in a single-precision data representation output.

The flow 100 includes outputting a result 170 of the manipulation, where the result comprises a single-precision data representation element. In embodiments, the outputting a result can include other data representations elements such as integer elements, double-precision elements, and the like. The result of the manipulation that is output can be transferred, stored, etc. The flow 100 includes forwarding the result to a next layer 180 of the neural network, based on the outputting. The next layer of the neural network can include a hidden layer, a fully connected layer, a convolution layer, a pooling layer, a rectified linear unit (ReLU) layer, and so on. In embodiments, the next layer can be an output layer of the neural network. The next layer can include other layers of the neural network. In further embodiments, the next layer can be a bottleneck layer of the neural network.

Figure 2:
FIG. 2 is a flow diagram for neural network calculations.
Figure 2:
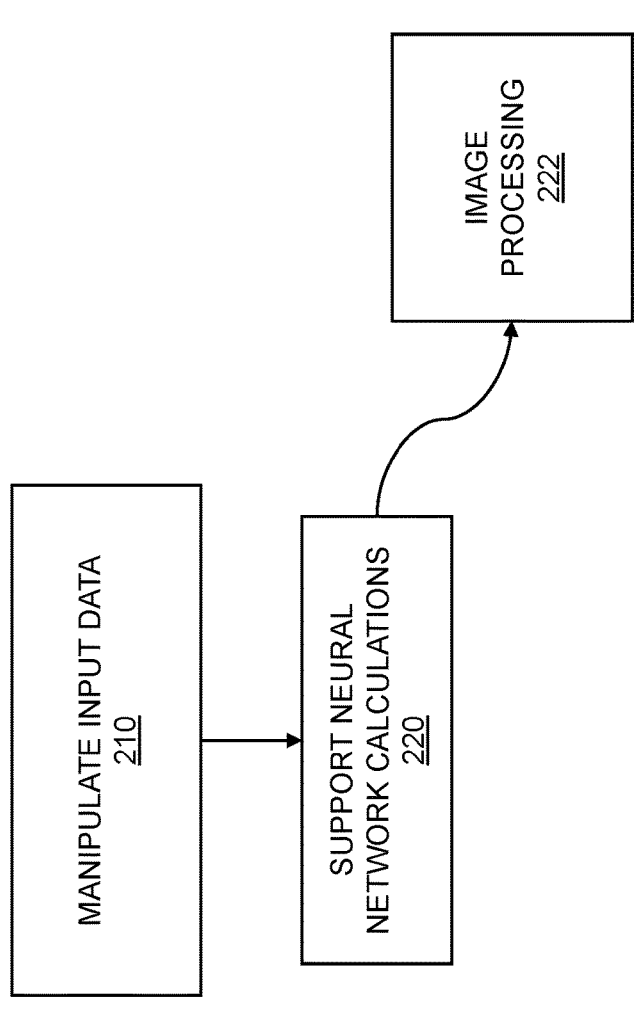

FIG. 2 is a flow diagram for neural network calculations. Input data, such as a first input data element and a second input data element can be manipulated by a neural network executing on a processor. Processing by the neural network uses mixed-precision data representation. Access to a processor that supports single-precision operations is obtained. The processor is used for neural network calculations. A first input data element and a second input data element are presented for manipulation on the processor, where the manipulation supports the neural network calculations. The first input data element is manipulated with the second input data element using the processor. The first input data element comprises a 16-bit reduced floating point representation. The result is forwarded to a next layer of the neural network, based on the outputting.

The flow 200 includes manipulating the first input data element 210 with the second input data element using the processor. The first input data element and the second data element can be represented using various numbering formats. The numbering format used for the first input data element, and the numbering format used for the second input data element need not be the same. The numbering formats or representations can include integer representations such as an 8-bit integer or an unsigned 8-bit integer; a 16-bit reduced floating point representation such as bfloat16; a single-precision floating point representation such as binary32; a double-precision floating point representation such as binary64; and so on. Further embodiments include factoring the 8-bit integer representation element into a 16-bit reduced floating point representation element to facilitate the manipulating. Other signed or unsigned integer representations, such as 16-bit integer representations, or other floating point representations, can also be used. In embodiments, the first input data element can include a 16-bit reduced floating point representation. The 16-bit reduced floating point representation can resemble a single-precision or 32-bit representation, but uses a shorter fraction. The 16-bit reduced floating point representation can be particularly well suited to neural network calculations because its small number of bits can be quickly manipulated.

In the flow 200, the manipulation supports the neural network calculations 220. The neural network can include a plurality of layers, where the plurality of layers can include an input layer, an output layer, a fully connected layer, a convolution layer, a pooling layer, a rectified linear unit (ReLU) layer, a bottleneck layer, and so on. The neural network layers between the input layers and the output layers can include hidden layers. The manipulating the input data elements to execute neural network calculations can include performing one or more operations, where the operations can include logical operations, mathematical operations, matrix operations, tensor operations, and so on. The manipulating can be performed on a processor within a neural network. The input data elements can include data such as image data, neural network weights or biases, etc. The weights within the neural network can be used to assign a relative importance of an input to a neuron within a layer of the neural network. The weights can be trained using single-precision data representations. In embodiments, the one or more input data elements can include one or more neural network biases. A neural network bias can include a node with a constant value such as one. The bias node can be used to ensure that the output of an element (neuron, perceptron) of a neural network does not always converge to a value such as zero. In embodiments, the one or more input data elements can include one or more neural network activations. A neural network activation, or activation function, can be used to determine whether a given neuron within the neural network should be activated. The activation can be decided based on calculating a weighted sum of the inputs and adding a bias to the weighted sum. The activation can introduce nonlinearity to the output of a neuron within the neural network. The neuron can be configured within a hidden layer of the neural network.

The representation or representations used for the first input data element and the second input data element can be determined based on a neural network operation, where the neural network operation can include a neural network calculation. Neural network calculations can be used for variety of data manipulation tasks. For example, the neural network calculation can be performed on a training set of data comprising "known" values, in order to train the neural network to perform specific data manipulation tasks. The first input data element comprising a 16-bit reduced floating point representation has been described. The second input data element may include a similar numbering representation. In embodiments, the second input data element can include a 16-bit reduced floating point representation. Other representations may also be used. In other embodiments, the second input data element can include an 8-bit integer representation element. The 8-bit integer representation can include a signed or an unsigned 8-bit integer representation. In embodiments, the 8-bit integer representation can include image data. Translations or factoring of one or more input data elements can be required for certain data processing or manipulating applications. In embodiments, the neural network processing comprises image processing 222. An image processing application can include identifying objects, matching faces, and so on. In embodiments, the image processing includes 8-bit integer representation operands. The 8-bit integer representation operands can include pixels or other elements of a gray-scale image, a color image, etc. In embodiments, the image data uses an 8-bit unsigned integer RGB representation. If the first input data element uses one representation such as a 16-bit reduced floating point representation while the second input data element uses another representation such as an 8-bit integer representation, then the input data representations can be translated or factored to another input data representation. Further embodiments include factoring the 8-bit integer representation element into a 16-bit reduced floating point representation element to facilitate the manipulating.

A variety of techniques can be used for the translating, factoring, etc., a data element based on one representation to another representation. In embodiments, input data elements based on a bfloat16 representation can be expanded to a single-precision floating point representation (binary32, fp32, etc.). The expanding can include padding the fraction of the bfloat16 representation with 16 bits of zeros. The resulting single-precision representation can be used for manipulations, neural network calculations, etc., based on single-precision floating point representations. Another translation or factoring can include expanding an 8-bit integer. The 8-bit integer can be expanded to a reduced floating point representation such as bfloat16, a single-precision floating point representation such as binary32 or fp32, and the like. One representation is translated or factored to another representation to support neural network calculations. The neural network calculations can generate sums, differences, products, quotients, etc., that can be based on one or more data representations. A calculation based on mixed representations, such as a calculation that includes addition or subtraction operations including a bfloat16 element and a binary32 element, can yield a binary32 or fp32 result. An addition or subtraction operation including two bfloat16 elements can yield an fp32 result. The fp32 result may require padding with one or more zero bits. Multiplication between two data elements typically yields representations including larger numbers of bits. In embodiments, a multiplication or a dot product operation between two data elements based on bfloat16 representations yields an fp32 result. Similarly, a multiplication or dot product operation between a bfloat16 representation and an 8-bit integer representation yields a single-precision or fp32 result.

Figure 3A:
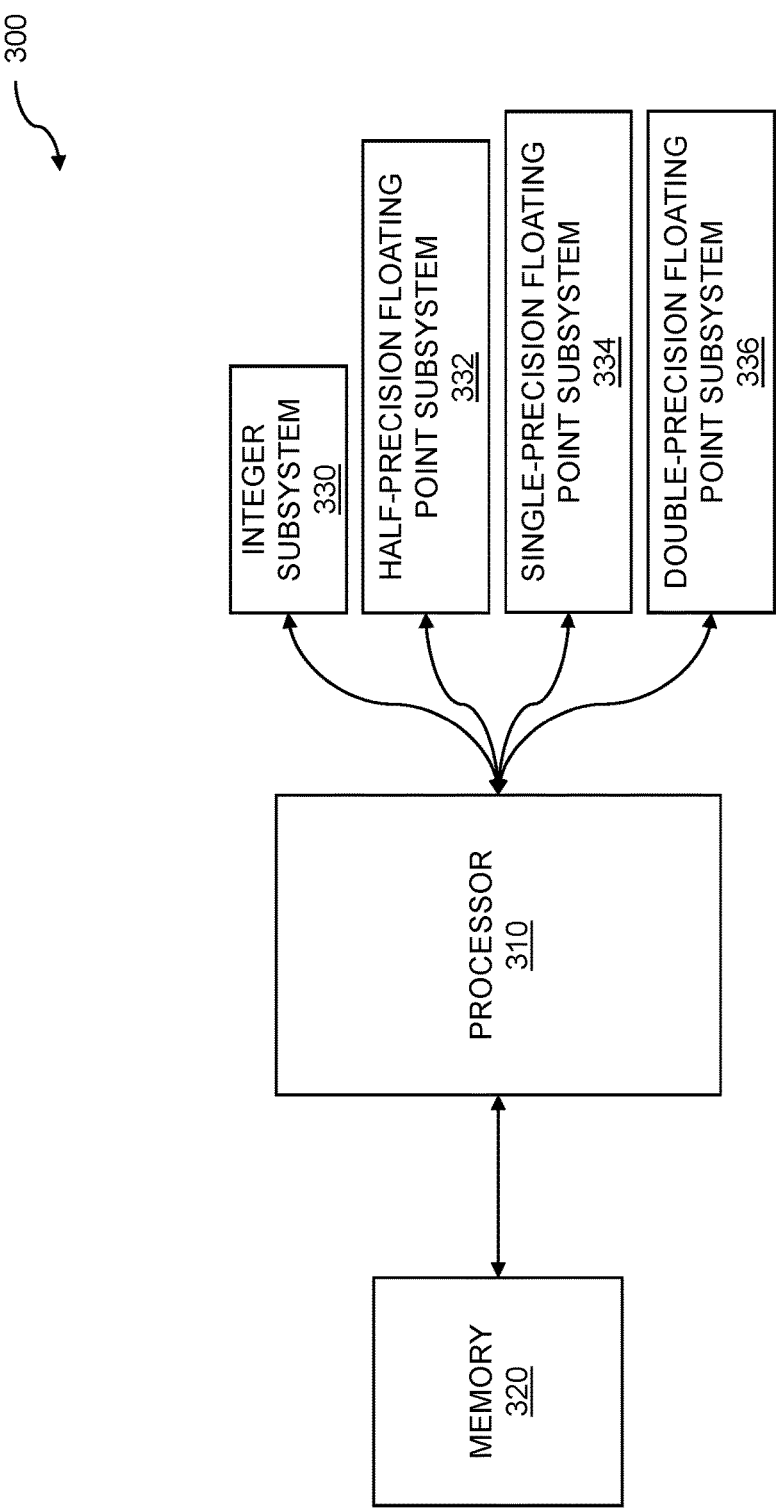
FIG. 3A is a block diagram for a processor system.

FIG. 3A is a block diagram for a processor system 300. A processor system can be used to perform data manipulation for one or more layers of a neural network. The processor can support neural network processing using mixed-precision data representation. Access to a processor that supports single-precision operations is obtained, where the processor is used for neural network calculations. A first input data element and a second input data element are presented for manipulation on the processor. The input data elements can include neural network weights, biases, or activations. The first input data element is manipulated with the second input data element using the processor. The first input data element can include a 16-bit reduced floating point representation. A single-precision data representation element result of the manipulation is output. The result is forwarded to a next layer of the neural network, based on the outputting.

A processor system can include one or more processors 310 connected to memory 320. The processors can be included in a neural network, where the neural network can include a convolutional neural network, a deep neural network, a recurrent neural network, and so on. The memory can include random access memory (RAM), memory accessible through direct memory access (DMA), high bandwidth memory (HBM), and the like. The processor can be coupled to one or more subsystems, where the subsystems can support operations based on a variety of number formats that can be manipulated by the processor. The operations can include logical operations, arithmetic operations, matrix operations, or tensor operations, etc. The subsystems can include an integer subsystem 330. The integer subsystem can support signed or unsigned integers. The subsystems can include a half-precision floating point subsystem 332. The half-precision subsystem can be based on a 16-bit floating point number format. The 16-bit floating point number format can include a 16-bit floating point (bfloat16). The subsystems can include a single-precision floating point subsystem 334. The single-precision floating point subsystem can be based on a standard 32-bit floating point number format such as binary32. The subsystems can include a double-precision floating point subsystem 336. The double-precision floating point subsystem can be based on a standard 64-bit floating point number format such as binary64.

Figure 3B:
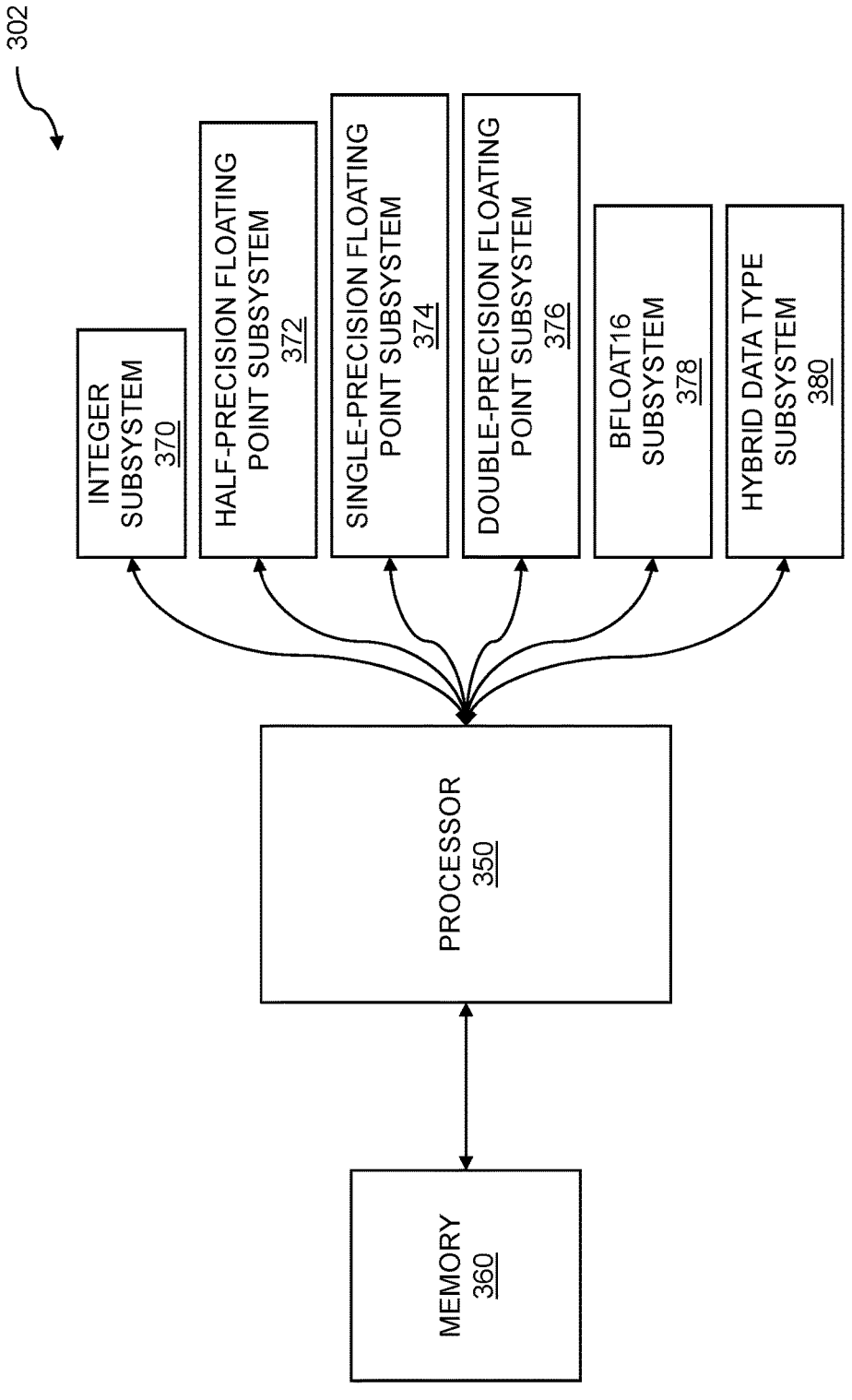
FIG. 3B is a block diagram for a processor system with bfloat16.

FIG. 3B is a block diagram for a processor system with bfloat16. As stated above, a processor system can perform data manipulation within a layer of a neural network. The neural network can include a deep neural network (DNN), a convolutional neural network (CNN), a recurrent neural network (RNN), or other neural network appropriate to data manipulation. Neural network processing uses mixed-precision data representation. The processor that performs the data manipulation supports single-precision operations, so obtained data that is in other number formats, such as RGB image data in unsigned integer format, can be converted prior to manipulation. Manipulation results that are output are forwarded to another layer within the neural network, based on the outputting.

A processor system with bfloat16 number representations 302 can include one or more processors 350 connected to memory 360. The one or more single-precision processors can manipulate data for a layer in a neural network. The memory can include RAM, DMA, HBM, or other appropriate storage. The processor 350 can be coupled to one or more subsystems that support operations. The operations that can be performed by the subsystems can be based on one or more number formats that can be manipulated by the processor. The operations performed by the one or more processors can include logical operations, arithmetic operations, matrix operations, tensor operations, etc. The subsystems can include an integer subsystem 370, where the integer subsystem can support signed integers or unsigned integers. The subsystems can include a half-precision floating point subsystem 372. The half-precision subsystem can be based on a 16-bit floating point number format. The subsystems can include a single-precision floating point subsystem 374 such as a subsystem based on a standard 32-bit floating point number format including binary32. The subsystems can include a double-precision floating point subsystem 376. The double-precision floating point subsystem can be based on a standard 64-bit floating point number format including binary64. The subsystems can include a bfloat16 subsystem 378. The bfloat16 representation, which can occupy 16 bits, can support a wide range of floating point numbers. The bfloat16 representation is similar to the binary32 floating point representation in that each representation includes a sign bit and eight exponent bits. The formats differ in that the bfloat16 representation includes seven significant bits, while the binary32 format includes 23 significant bits. Just as the larger number of significant bits of the binary32 representation can support higher precision, the smaller number of significant bits of the bfloat16 representation can support simpler processor design, faster computations, reduced storage requirements, and so on. The subsystems can include a hybrid data type subsystem 380. The hybrid data type subsystem can perform operations based on a hybrid data type that manipulates an 8-bit unsigned integer representation and a 16-bit reduced floating point representation. The 16-bit reduced floating point representation can include a bfloat16 representation.

Figure 4:
FIG. 4 illustrates conversion from bfloat16 for single precision.
Figure 4:
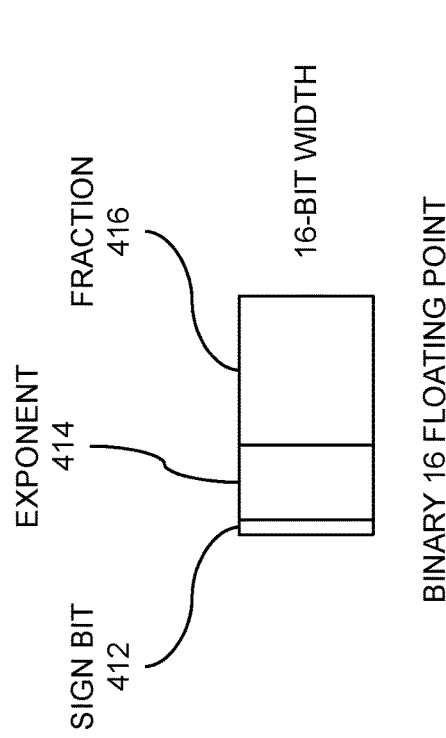
Figure 4:
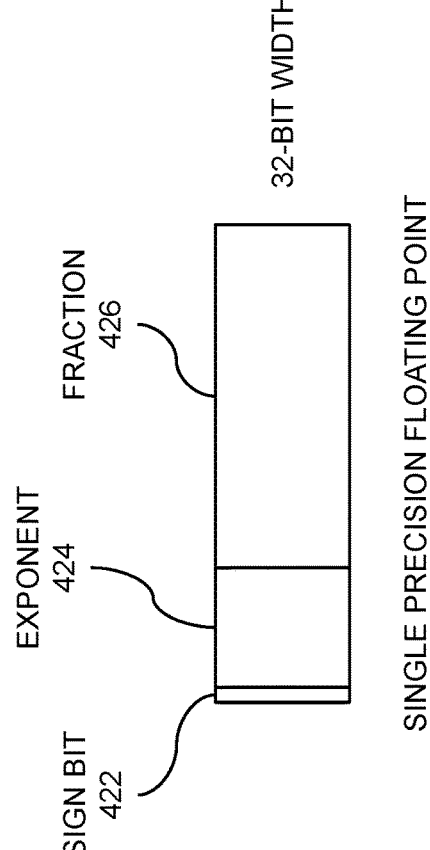

FIG. 4 illustrates conversion from bfloat16 for single precision. Data can be manipulated based on various operations such as logical operations, arithmetic operations, matrix operations, tensor operations, and the like. A processor can perform the manipulating, where the processor can support operations based on a numerical representation such as single-precision floating point representation. The representation can support neural network processing using mixed-precision data representation. Access to a processor that supports single-precision operations is obtained, where the processor is used for neural network calculations. A first input data element and a second input data element are presented for manipulation on the processor, where the manipulation supports the neural network calculations. The first input data element and the second input data element are manipulated using the processor, where the first input data element comprises a 16-bit reduced floating point representation. The 16-bit reduced floating point data element can include one or more neural network weights, one or more neural network biases, or one or more neural network activations. A result of the manipulation is output, where the result comprises a single-precision data representation element. The result is forwarded to a next layer of the neural network, based on the outputting. The next layer can be an output layer, a fully connected layer, a convolution layer, a pooling layer, a rectified linear unit (ReLU) layer, a bottleneck layer, and so on.

Two floating point representations are shown 400. The floating point representations can include a 16 floating point (bfloat16) representation 410, and a single-precision floating point (binary32) representation 420. Other floating point representations, such as double-precision floating point (binary64) may also be used. The bfloat16 representation comprises a sign bit 412, an 8-bit field for an exponent 414, and a 7-bit field for a fraction or significant 416. While only seven bits of the significant are stored, the storing the significant can support eight bits of precision. The binary32, or single-precision, representation comprises a sign bit 422, an 8-bit field for an exponent 424, and a 23-bit field for the fraction or significant 426. The differences between the bfloat16 representation and the binary32 representation are the number of bits of the significant and the precision of the significant. To convert from the binary32 to the bfloat16 representation, the significant can be truncated or rounded to fit within the reduced number of bits. To convert from the bfloat16 to the binary32 representation, the significant can be padded with ones or zeros to fill out the increased number of bits.

Figure 5:
FIG. 5 shows conversion from RGB image data to bfloat16.
Figure 5:
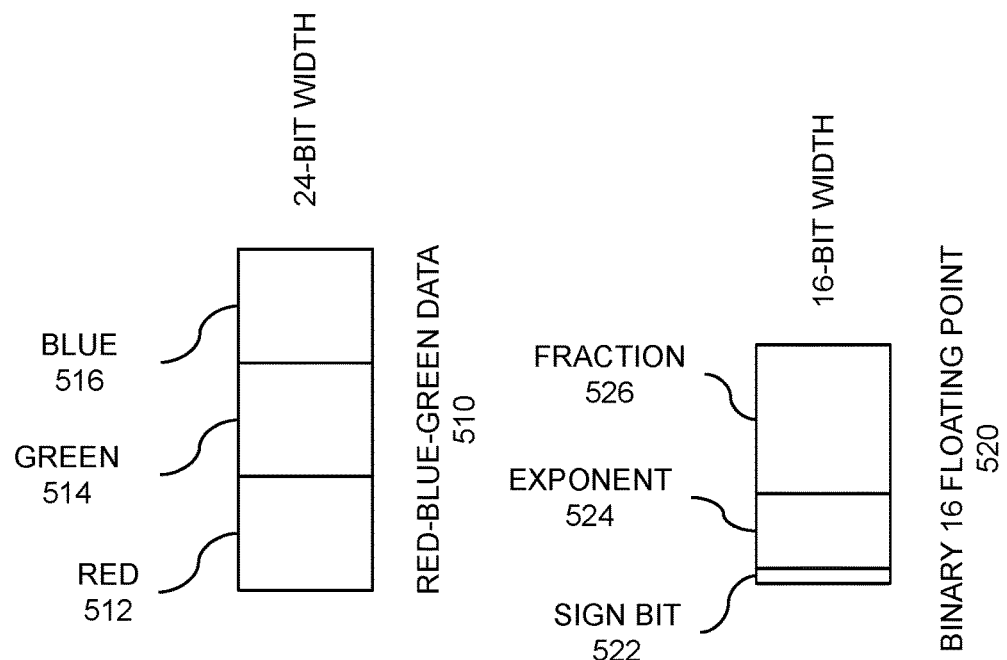

FIG. 5 shows conversion from RGB image data to bfloat16 500. Image data, such as red-green-blue (RGB) image data, can be represented using an 8-bit unsigned integer format. Processors that can be used to operate on the image data can support operations based on a single-precision floating point representation. The processors can be included within a neural network. In order for the RGB image data to be manipulated, the image data can be converted to the single-precision floating point representation. The single-precision floating point representation can be used for neural network processing using mixed-precision data representation. Access to a processor that supports single-precision operations is obtained, where the processor is used for neural network calculations. A first input data element and a second input data element are obtained for manipulation on the processor, where the manipulation supports the neural network calculations. The first input data element is manipulated with the second input data element using the processor, where the first input data element comprises a 16-bit reduced floating point representation. A result of the manipulation is output, where the result comprises a single-precision data representation element. The result is forwarded to a next layer of the neural network, based on the outputting.

Image data, such as RGB image data, can be represented in a plurality of bytes, where an 8-bit byte is used for each color 510. A byte can represent a value, intensity, or magnitude for red 512, green 514, and blue 516. Each color can be represented by an 8-bit unsigned integer. To process the RGB image data, each 8-bit (1 byte) unsigned integer can be converted to a floating point representation, where the floating point representation can be manipulated by a processor. The floating point representation can include a 16-bit reduced floating point representation such as bfloat16 520. Bfloat16 can represent a wide range of values by assigning the representation of the values based on a floating radix point. The bfloat16 representation includes a sign bit 522, an 8-bit exponent 524, and a 7-bit fraction or significant 526. While seven bits are explicitly stored within the bfloat16 value, the value of the significant can include eight bits of precision. Bfloat16 representations share the sign bit and the number of exponent bits (eight bits) of single-precision floating point (binary32) representations. The binary32 representation uses a total of 32 bits for each floating point value. The loss of precision of bfloat16 versus binary32 results from bfloat16 using only seven bits for representing the significant, while binary32 uses 23 bits. Conversion between binary32 and bfloat16 representations can be accomplished by truncating or rounding the value represented by 23 bits in the binary32 representation to seven bits in the bfloat16 representation.

Figure 6:
FIG. 6 illustrates 128-bit bfloat16 dot-product logic.
Figure 6:
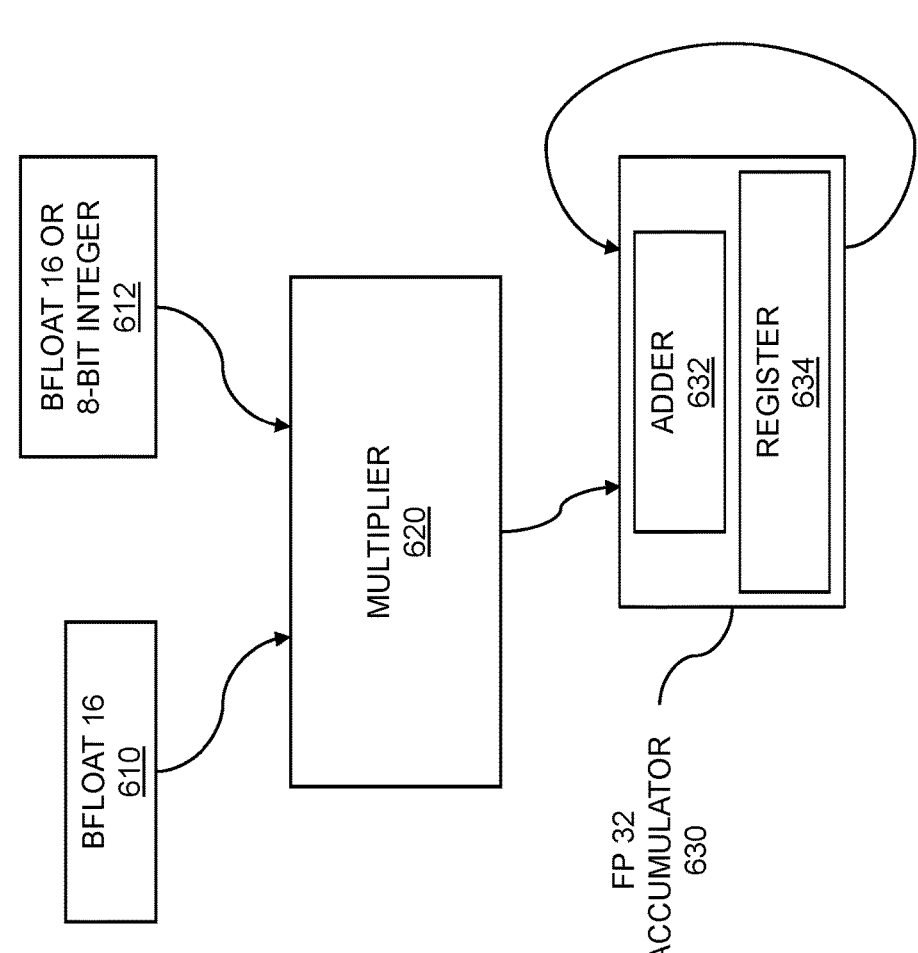

FIG. 6 illustrates 128-bit bfloat16 dot-product logic. A dot product or scalar product can be computed for two sequences of numbers, where the sequences of numbers are of equal length. Data manipulation such as the dot product can be performed on a processor. The processor can include one or more elements within a reconfigurable fabric, a programmable integrated circuit such as an FPGA or ASIC, etc. The dot product can be computed for neural network processing using mixed-precision data representation. Access is obtained to a processor that supports single-precision operations is obtained, where the processor is used for neural network calculations. A first input data element and a second input data element for manipulation on the processor are obtained, where the manipulation supports the neural network calculations. A result of the manipulation is output, where the result comprises a single-precision data representation element. The result is forwarded to a next layer of the neural network, based on the outputting.

The dot product of two sequences of numbers can be computed by summing the products of corresponding numbers from each of the two sequences of numbers. That is, the first two numbers are multiplied together; the second two numbers are multiplied together and their product is added to the product of the first pair of numbers; the third two numbers are multiplied together and their product is added to the prior products; and so on for each pair of numbers in the two sequences of numbers. The sequences of numbers can be coordinate vectors. In geometric terms, the dot product, also called the inner product, can be the product of the Euclidean magnitudes of the vectors and the cosine of the angle found between the two vectors. The dot product can be used for determining vector lengths and other computations.

A block diagram for 128-bit bfloat16 dot-product logic is shown 600. The two sequences of numbers can include input data for manipulation in a layer of a neural network. The two sequences can include image data, such as unsigned 8-bit RGB image data, that can be converted to a 16-bit reduced floating point representation. For computing the bfloat16 dot product, the sequences of numbers can include an RGB image converted to a bfloat16 610 representation, a bfloat16 or 8-bit integer 612 representation, and so on. To compute the products of the corresponding numbers from each of the two input sequences, a multiplier 620 can be used. The multiplier can be based on various numbers of bits to support a variety of precisions. In embodiments, the multiplier can be based on single-precision floating point (binary32), double-precision floating point (binary64), and so on. As the product of each corresponding pair of numbers in the sequences of numbers is computed, an accumulation or "running total" can be computed using an accumulator. The accumulator can include a single-precision floating point (fp32, binary32) accumulator 630. The accumulator can include an adder 632 and a register 634. The accumulator can be used for summing the product currently output from the multiplier and the previous running total. The register can be used for storing the running total. If the precision of the accumulator is less than that of the multiplier, the values manipulated within the accumulator can be determined by rounding or truncating the higher precision values computed by the multiplier.

Figure 7:
FIG. 7 shows 128-bit RGB data dot-product logic.
Figure 7:
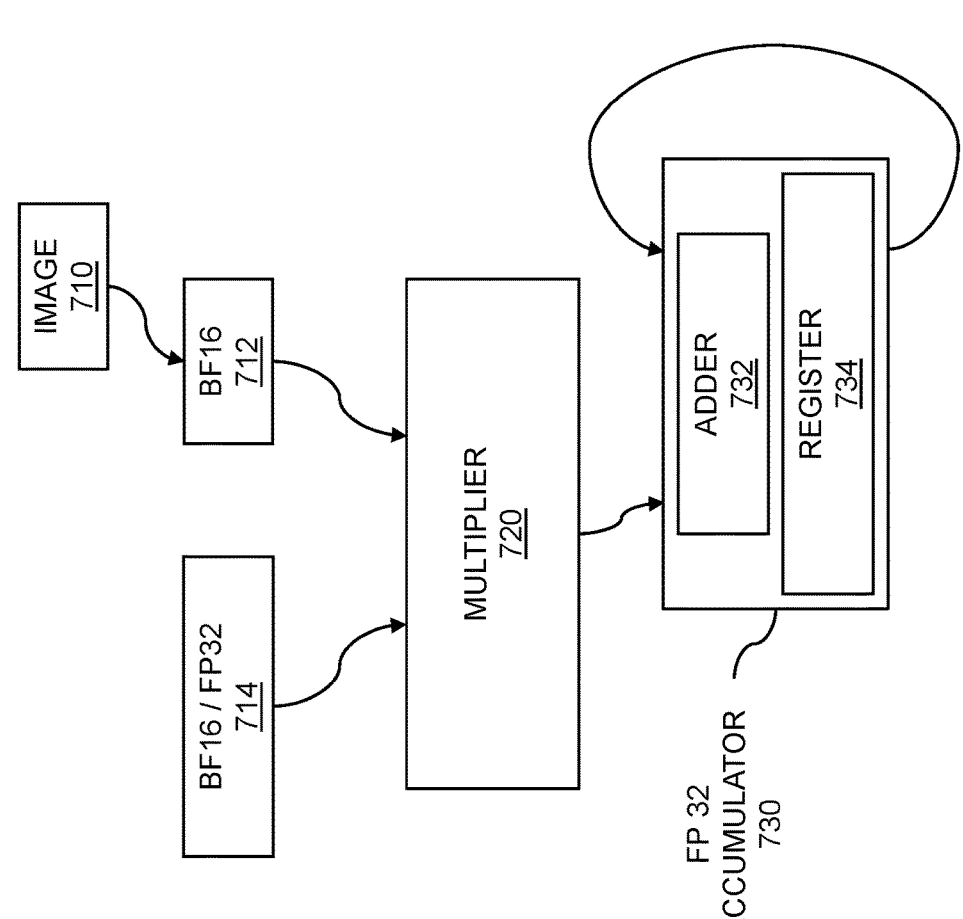

FIG. 7 shows 128-bit RGB data dot-product logic. Described throughout, a dot product between two equal length sequences of numbers can be computed as a sum of products of the corresponding entries in the sequences. The sum of products can be computed using various precisions such as bfloat16, binary32, binary64, and so on. The computing the dot product can be based on a 16-bit reduced floating point representation. The sequences of numbers can include red-green-blue (RGB) data such as the RGB data that can describe an image. Since a processor on which data such as the RGB image data can be processed can support single-precision or other precision operations, the data to be processed may require conversion. The data can be converted from its native precision into the native precision of the processor on which the computations are performed. The processing can include neural network processing using mixed-precision data representation. Access to a processor that supports single-precision operations is obtained, where the processor is used for neural network calculations. A first input data element and a second input data element are presented for manipulation on the processor, where the manipulation supports the neural network calculations. The first input data element is manipulated with the second input data element using the processor, where the first input data element comprises a 16-bit reduced floating point representation. A result of the manipulation is output, where the result comprises a single-precision data representation element. The result is forwarded to a next layer of the neural network, based on the outputting.

A diagram for 128-bit RGB data dot-product logic is shown 700. A dot-product operation can be performed on data such as image data. In embodiments, the image data can use an 8-bit unsigned integer RGB representation 710. In an 8-bit unsigned integer representation, the eight bits can represent a value between zero and 255 ($2^8-1$). Recall that manipulations on the obtained input data are performed on a processor that supports operations such as single-precision operations. The unsigned 8-bit integer RGB data is converted to a 16-bit reduced floating point representation. In embodiments, the RGB image data can be represented in bfloat16 format 712 without loss of precision. The dot product operation or other operations can include mixed-precision operations. Mixed precision operations can include addition, subtraction, multiplication, division, square root, reciprocal, reciprocal square root, and so on. The mixed precision operations can be performed on operands that are represented using different precisions. The mixed-precision operations can be performed on operands such as 8-bit unsigned integer and bfloat16; bfloat16 and binary32, 8-bit unsigned integer and binary32, and so on. The RGB data converted to bfloat16 format can be multiplied by a bfloat16 value or a floating point 32 (binary32) value 714. Recall that bfloat16 and float 32 both represent floating point values using the same sign, exponent, and significant representations. The distinction between the bfloat16 and binary32 formats is that bfloat16 uses seven explicitly stored bits while binary32 uses 23 bits. The multiplication of a number in bfloat16 representation can be multiplied directly by another bfloat16 number. A bfloat16 number in a bfloat16 representation can be multiplied by a binary32 number by padding the bfloat16 number with 23−7=16 zeros to fill out the additional significant bits.

The input data can be converted to other representations such as hybrid representations or hybrid numbering types which can be supported for data manipulations. In embodiments, the hybrid data type support can include support for an 8-bit unsigned integer representation and a 16-bit reduced floating point representation. Recall that the processor performing the data manipulations can perform single-precision operations. Embodiments can include performing left or right versions of commands. The left or right versions of commands can be used to perform operations on numbers that are represented using different numbering schemes. In a usage example, a bfloat16 number can be multiplied by a binary32 number. A left version of the command can multiply the seven bits of the bfloat16 significant with the seven most significant bits (MSB) of the binary32 significant. The right version of the command can multiply the seven bits of the bfloat16 significant by the 16 least significant bits (LSB) of the binary32 significant.

The dot product is determined by computing a sum of products. The products can be determined using a multiplier 720. The multiplier can be used to determine products of a given bit width. The bit width can be chosen based on the desired precision for the multiplications, where the precision can include single precision (binary32), double precision (binary64), and so on. Products or partial products based on lower precision can be computed based on truncation, rounding, approximation, and the like. The sums of products can be computed based on an accumulator. In embodiments, the accumulator can be based on a single-precision floating point accumulator 730. An accumulator can perform operations including addition and storage. In embodiments, the accumulator 730 can include an adder 732 and a register 734. A product or partial product from the multiplier can be added to a previous partial product or value within the accumulator.

Figure 8:
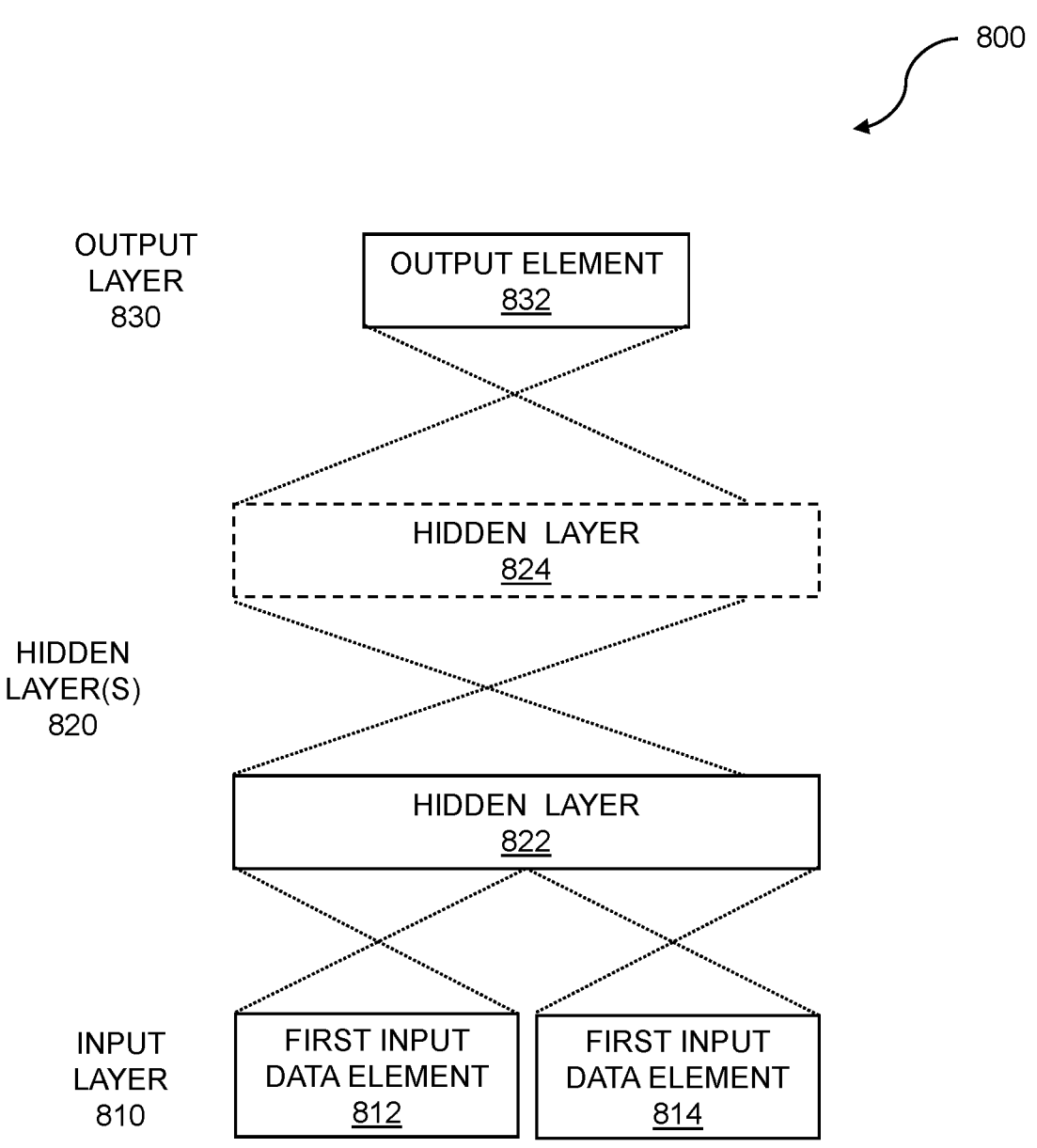
FIG. 8 illustrates an example neural network.

FIG. 8 illustrates an example neural network. A neural network can include a plurality of layers, where a layer can perform one of a variety of neural network calculations. The plurality of layers within the neural network can comprise a convolutional neural network, a recurrent neural network, a deep neural network, and so on. The layers can include input layers, output layers, fully connected layers, convolution layers, pooling layers, rectified linear unit (ReLU) layers, and so on. The results of neural network calculations can be forwarded to a next layer within the neural network. In embodiments, the next layer can be a bottleneck layer of the neural network. The bottleneck layer or the other layers support neural network processing using mixed-precision data representation. The neural network can apply weights, biases, classifiers, etc., to input data such as image data. Access to a processor that supports single-precision operations is obtained, where the processor is used for neural network calculations. A first input data element and a second input data element are presented for manipulation on the processor, where the manipulation supports the neural network calculations. The first input data element is manipulated with the second input data element using the processor, where the first input data element comprises a 16-bit reduced floating point representation. A result of the manipulation is output, where the result comprises a single-precision data representation element. The result is forwarded to a next layer of the neural network, based on the outputting.

Layers including one or more hidden layers are shown for a neural network 800. The neural network layers, such as the one or more hidden layers, a bottleneck layer, and so on, can be used for a variety of applications data manipulation. The data manipulation can include data manipulation for image processing or other processing applications. The deep neural network can include a plurality of layers. The plurality of layers can include an input feature layer 810. The input layer can receive data presented to the layer for manipulation, where the data can include a first data element 812, a second data element 814, and so on. While two data elements are shown, other numbers of data elements can be presented to the input layer for processing. A variety of numbering formats can be used to represent the first data element, the second data element, and so on. The numbering formats can include integer formats (signed, unsigned), reduced floating point, single-precision floating point, double-precision floating point, and so on. In embodiments, the first input data element includes a 16-bit reduced floating point representation. The second input data element can also include one or more numbering formats. In embodiments, the second input data element can be an 8-bit integer representation element. The 8-bit integer representation can include an unsigned integer representation, where the unsigned integer representation can be used to represent red-green-blue (RGB) image data.

The neural network can include one or more hidden layers 820. As discussed throughout, the one or more hidden layers can include fully connected layers, convolution layers, pooling layers, rectified linear unit (ReLU) layers, and so on. The example neural network shows two hidden layers 822 and 824. While two hidden layers are shown, one or more hidden layers can be included in the neural network. In embodiments, one or more hidden layers can include a bottleneck layer. When a hidden layer comprises a bottleneck layer, the bottleneck layer can learn one or more translation vectors. The translation vectors can be used to transform image data or other data. A hidden layer can differ from other layers such as hidden layers within the neural network in that the bottleneck layer can include fewer nodes than the one or more preceding hidden layers. The bottleneck layer can act to create a constriction or "bottleneck" within the neural network. The bottleneck layer can constrict the information contained within the data elements being manipulated by the neural network into a low dimensional representation. The low dimensional representation can improve convergence for the data manipulation being performed by the neural network. When the data manipulation includes image processing, features within the image can be extracted. The extraction of features within the image can be accomplished using supervised techniques or unsupervised techniques. The neural network can include one or more output layers 830. The output layer can include an output element 832. The output layer can include a result from manipulating the first data element and the second data element. An output can result from various operations that can be performed by the neural network, including addition, subtraction, multiplication, division, and so on. The operation can include a dot product operation. In embodiments, the result of the operation can be represented using a single-precision data representation.

Figure 9:
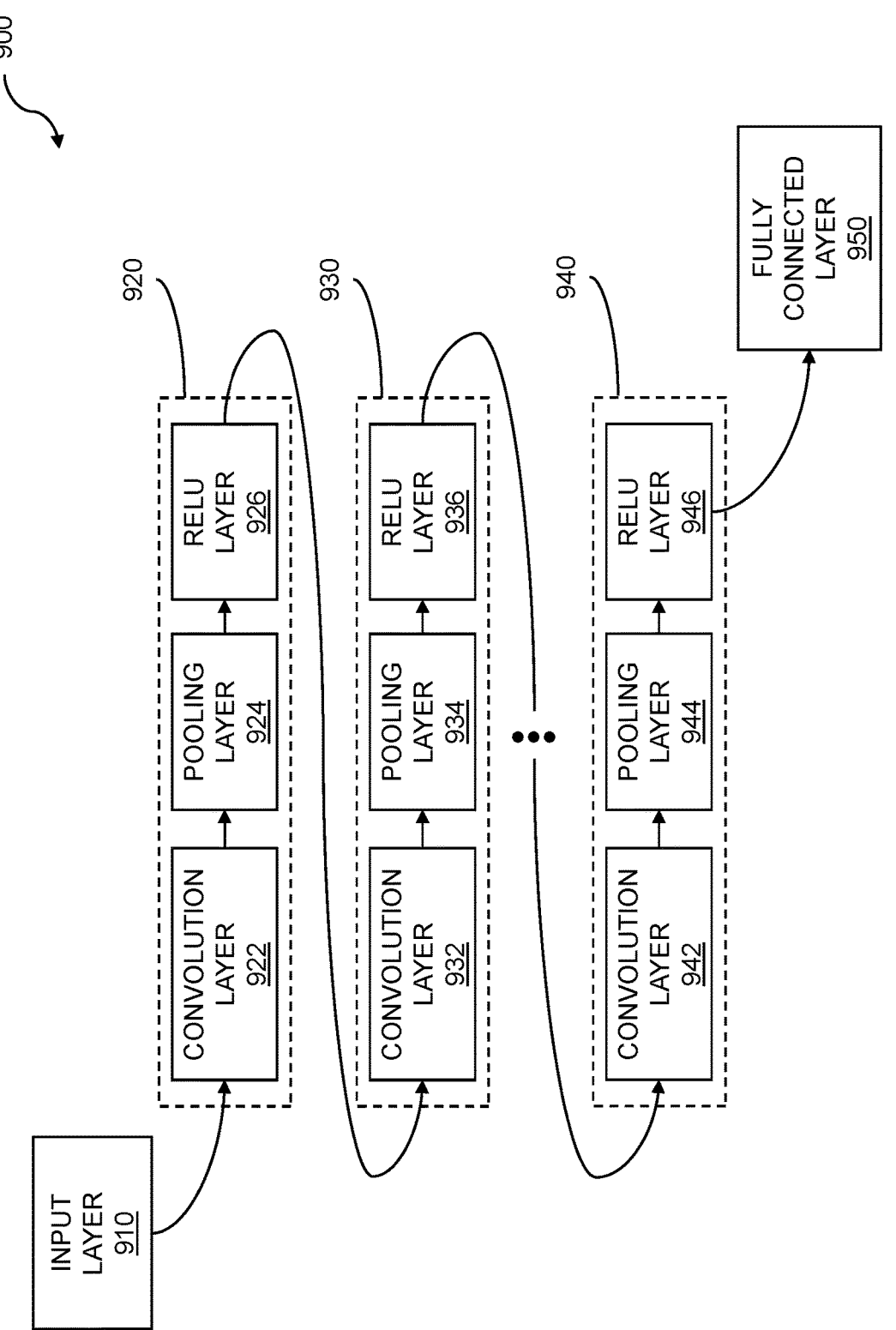
FIG. 9 shows a deep learning block diagram.

FIG. 9 shows a deep learning block diagram. The deep learning block diagram 900 can include a neural network such as a deep neural network (DNN), a convolutional neural network (CNN), a recurrent neural network (RNN), and so on. A convolutional neural network can be based on layers, where the layers can include input layers, output layers, fully connected layers, convolution layers, pooling layers, rectified linear unit (ReLU) layers, bottleneck layers, and so on. The layers of the convolutional network can be implemented using a reconfigurable fabric. The reconfigurable fabric can include processing elements, switching elements, storage elements, etc. The reconfigurable fabric can be used to perform various operations such as logical or other operations, neural network calculations, and the like. Deep learning can be applied to neural network processing using mixed-precision data representation. The layers of the neural network such as the convolutional neural network can be implemented within one or more integrated circuits or chips, where the chips can include a reconfigurable fabric, an FPGA, an ASIC, and the like. A given chip from among the one or more chips can implement one or more layers of the neural network. When a neural network such as a convolutional neural network cannot be loaded into a reconfigurable fabric, the neural network may be partitioned, where a partition may "fit" into the reconfigurable fabric, FPGA, ASIC, etc.

A deep learning block diagram 900 is shown. The block diagram can include various layers, where the layers can include an input layer, hidden layers, a fully connected layer, and so on. In some embodiments, the deep learning block diagram can include a classification layer. The input layer 910 can receive input data, where the input data can include a first collected data group, a second collected data group, a third collected data group, a fourth collected data group, etc. The collecting of the data groups can be performed in a first locality, a second locality, a third locality, a fourth locality, and so on, respectively. The input layer can then perform processing such as partitioning collected data into non-overlapping partitions. The deep learning block diagram 900, which can represent a network such as a convolutional neural network, can contain a plurality of hidden layers. While three hidden layers, a first hidden layer 920, a second hidden layer 930, and a third hidden layer 940 are shown, other numbers of hidden layers may be present. Each hidden layer can include layers that perform various operations, where the various layers can include a convolution layer, a pooling layer, and a rectified layer such as a rectified linear unit (ReLU) layer. Thus, a first layer 920 can include a convolution layer 922, a pooling layer 924, and a ReLU layer 926; a second layer 930 can include a convolution layer 932, a pooling layer 934, and a ReLU layer 936; and a third layer 940 can include a convolution layer 942, a pooling layer 944, and a ReLU layer 946. The convolution layers 922, 932, and 942 can perform convolution operations; the pooling layers 924, 934, and 944 can perform pooling operations, including max pooling, such as data down-sampling; and the ReLU layers 926, 936, and 946 can perform rectification operations. A convolutional layer can reduce the amount of data feeding into a fully connected layer. The block diagram 900 can include a fully connected layer 950. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs can be configured in arrangements such as quads and can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents.

Autonomous agents can include entities such as groups, organizations, and so on. The actions and interactions of the autonomous agents can be simulated to determine how the agents can influence the operation of an entire system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 10:
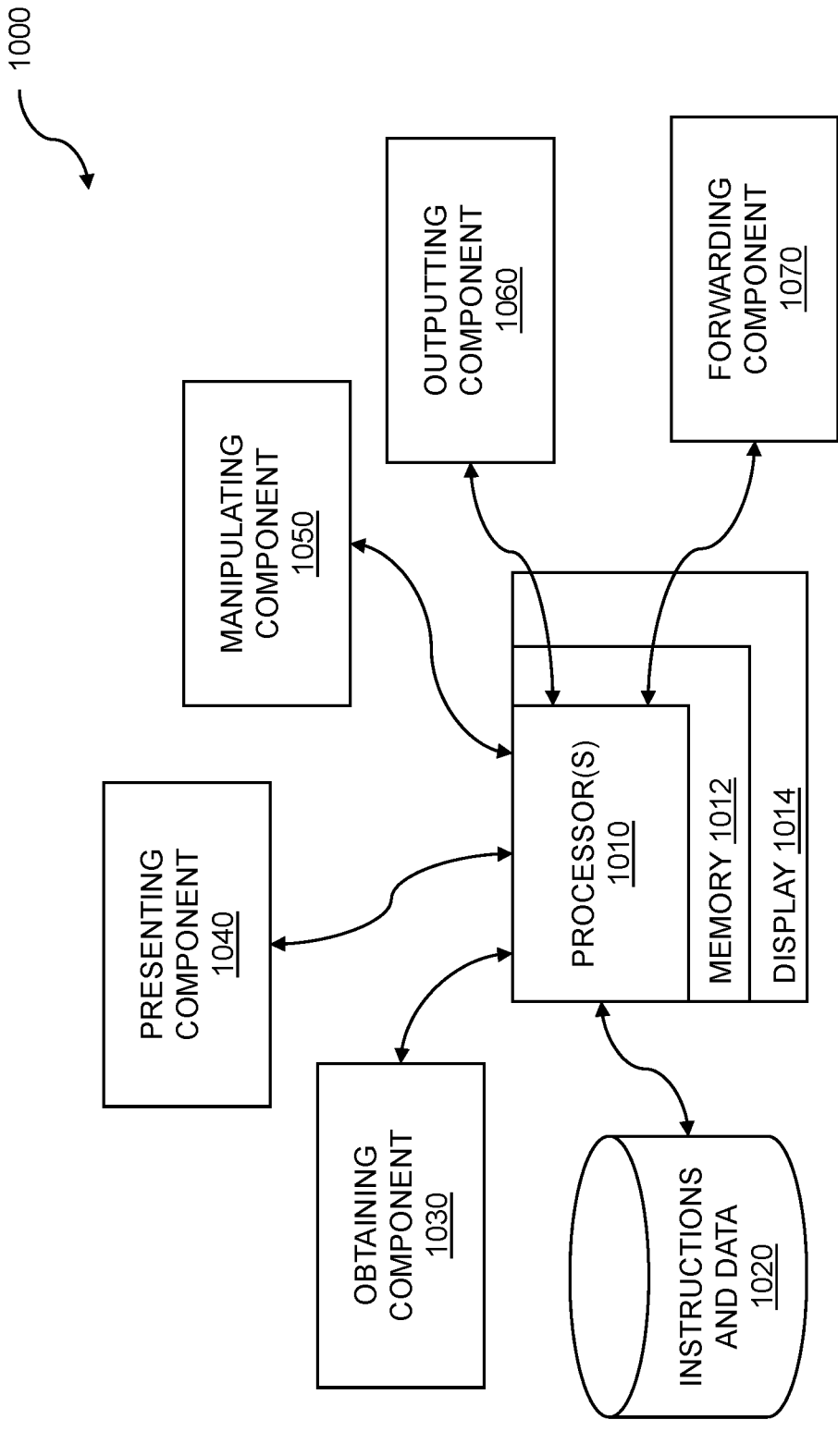
FIG. 10 is a system diagram for data manipulation.

FIG. 10 is a system diagram for data manipulation using representations as described above. The system 1000 can include one or more processors 1010 coupled to a memory 1012 which stores instructions. The system 1000 can include a display 1014 coupled to the one or more processors 1010 for displaying data, data representation elements, intermediate steps, instructions, and so on. In embodiments, one or more processors 1010 are coupled to the memory 1012 where the one or more processors, when executing the instructions which are stored, are configured to: obtain access to a processor that supports single-precision operations, where the processor is used for neural network calculations; present a first input data element and a second input data element for manipulation on the processor, where the manipulation supports the neural network calculations; manipulate the first input data element with the second input data element using the processor, where the first input data element comprises a 16-bit reduced floating point representation; output a result of the manipulation, where the result comprises a single-precision data representation element; and forward the result to a next layer of the neural network, based on the outputting.

The system 1000 can include a collection of instructions and data 1020. The instructions and data 1020 may be stored in a database, one or more statically linked libraries, one or more dynamically linked libraries, precompiled headers, source code, flow graphs, or other suitable formats. The instructions can include instructions for neural network processing using mixed-precision data representation. In embodiments, the processors can include processing elements within a reconfigurable fabric, a parallel processor, a mesh processor, a distributed processor, programmable integrated circuits such as FPGAs or ASICs, and so on. The system 1000 can include an obtaining component 1030. The obtaining component can include functions and instructions for obtaining access to a processor that supports single-precision operations, where the processor is used for neural network calculations. In embodiments, the processors can include processing elements within a reconfigurable fabric, a parallel processor, a mesh processor, a distributed processor, programmable integrated circuits such as FPGAs or ASICs, and so on. The processor may be able to support other operations such as integer operations, 16-bit reduced floating point operations, 8-bit integer operations, double-precision operations, and so on. In embodiments, the input data can include single instruction multiple data (SIMD) data representations. Single-precision operations can be performed on single-precision data representations.

The system 1000 can include a presenting component 1040. The presenting component can include functions and instructions for presenting a first input data element and a second input data element for manipulation on the processor, where the manipulation supports the neural network calculations. The presenting the first input data element and the second input data element can include routing data to the processor, filling a register or register file, filling a first in first out (FIFO) memory, and so on. The neural network calculation can include arithmetic operations, convolution calculations, pooling operations, rectified linear unit (ReLU) activations, etc. The system 1000 can include a manipulating component 1050. The manipulating component can include functions and instructions for manipulating the first input data element with the second input data element using the processor, where the first input data element comprises a 16-bit reduced floating point representation. In embodiments, the first input data element comprising a 16-bit reduced floating point representation can include one or more neural network weights, biases, activations, and so on.

The system 1000 can include an outputting component 1060. The outputting component can include functions and instructions for outputting a result of the manipulation, where the result comprises a single-precision data representation element. The result that is output can include other data representations including integer representations, reduced-precision representations, double-precision representations, and so on. The system 1000 can include a forwarding component 1070. The forwarding component can include functions and instructions for forwarding the result to a next layer of the neural network, based on the outputting. The next layer of the neural network can be a layer from a plurality of layers within the neural network. In embodiments, the next layer can be an output layer of the neural network. The layer to which the result is forwarded can include other types of layers within a neural network, where the other types of layers can include fully connected layers, convolution layers, pooling layers, rectified linear unit (ReLU) layers, and so on. In embodiments, the layer of the neural network can include a reconfigurable fabric. The data that can result from the manipulating, by a layer, of data from a previous layer, can be forwarded to the next layer. In embodiments, the next layer can be an output layer. The next layer within the neural network can include other layers such as one or more hidden layers. In embodiments, the next layer is a bottleneck layer of the neural network.

The system 1000 can include a computer program product embodied in a non-transitory computer readable medium for data manipulation, the computer program product comprising code which causes one or more processors to perform operations of: obtaining access to a processor that supports single-precision operations, where the processor is used for neural network calculations; presenting a first input data element and a second input data element for manipulation on the processor, where the manipulation supports the neural network calculations; manipulating the first input data element with the second input data element using the processor, where the first input data element comprises a 16-bit reduced floating point representation; outputting a result of the manipulation, where the result comprises a single-precision data representation element; and forwarding the result to a next layer of the neural network, based on the outputting.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:

accessing a first input data element and a second input data element for manipulation on a processor that supports single precision operations, wherein:

the first input data element comprises one or more parameters of a neural network trained on training data represented by a single-precision data representation, wherein each parameter of the neural network comprises a 16-bit reduced floating point representation that does not vary from parameter to parameter of the neural network, and wherein training the neural network using the single-precision training data produces the parameters of the neural network as represented by a 16-bit reduced floating point representation; and the second input data element comprises input data, that does not define any parameter of the neural network, for processing by the neural network;

converting the second input data element from a first data representation to a 16-bit reduced floating point representation;

processing, by at least a first layer of the neural network, the first and second input data elements, comprising:

manipulating, by the processor, the first input data element with the second input data element, wherein the first input data element comprises a 16-bit reduced floating point representation, to produce a single-precision data output as a result of the manipulation of the 16-bit reduced floating point first input data element and the 16-bit reduced floating point second input data element;

outputting the result of the manipulation, wherein the result comprises a single-precision data representation element; and forwarding the result to a next layer of the neural network, based on the outputting;

determining whether the next layer of the neural network is an output layer of the neural network;

in response to a determination that the next layer is not the output layer of the neural network, then defining the second input data element as the result of the manipulation and repeating the accessing, converting, and processing steps with the next layer of the neural network; and in response to a determination that the next layer is the output layer, then outputting the result of the manipulation.

2. The method of claim 1 wherein the second input data element comprises a 16-bit reduced floating point representation.

3. The method of claim 1 wherein the second input data element comprises an 8-bit integer representation element.

4. The method of claim 3 further comprising factoring the 8-bit integer representation element into a 16-bit reduced floating point representation element to facilitate the manipulating.

5. The method of claim 3 wherein the 8-bit integer representation comprises image data.

6. The method of claim 5 wherein the image data uses an 8-bit unsigned integer RGB representation.

7. The method of claim 1 wherein the first input data element comprises one or more neural network weights.

8. The method of claim 7 wherein the weights are trained using single-precision data representations.

9. The method of claim 1 wherein the second input data element comprises a single-precision data representation element.

10. The method of claim 1 wherein the neural network processing comprises image processing.

11. The method of claim 1 wherein the next layer is a bottleneck layer of the neural network.

12. The method of claim 1 wherein the manipulating comprises neural network addition or subtraction operations.

13. The method of claim 12 wherein the addition or subtraction operations include a single-precision data representation operand and a 16-bit reduced floating point data representation operand as inputs resulting in a single-precision data representation output.

14. The method of claim 12 wherein the addition or subtraction operations facilitate calculating a dot product.

15. The method of claim 14 wherein the dot product includes an 8-bit integer data representation operand and a 16-bit reduced floating point data representation operand as inputs resulting in a single-precision data representation output.

16. The method of claim 1 further comprising including commands, for the processor, that support single-precision operands and 16-bit reduced floating point representation operands in the same operation.

17. The method of claim 1 further comprising adding commands for the processor that support 8-bit integer representation operands and 16-bit reduced floating point representation operands in the same operation.

18. The method of claim 1 wherein the 16-bit reduced floating point representation comprises a bfloat16 data representation.

19. The method of claim 1 wherein the 16-bit reduced floating point representation comprises a reduced mantissa floating point representation.

20. A computer program product embodied in a non-transitory computer readable medium for data manipulation, the computer program product comprising code which causes one or more processors to perform operations of:

accessing a first input data element and a second input data element for manipulation on a processor that supports single precision operations, wherein:

the first input data element comprises one or more parameters of a neural network trained on training data represented by a single-precision data representation, wherein each parameter of the neural network comprises a 16-bit reduced floating point representation that does not vary from parameter to parameter of the neural network, and wherein training the neural network using the single-precision training data produces the parameters of the neural network as represented by a 16-bit reduced floating point representation; and the second input data element comprises input data, that does not define any parameter of the neural network, for processing by the neural network;

converting the second input data element from a first data representation to a 16-bit reduced floating point representation;

processing, by at least a first layer of the neural network, the first and second input data elements, comprising:

manipulating, by the processor, the first input data element with the second input data element, wherein the first input data element comprises a 16-bit reduced floating point representation, to produce a single-precision data output as a result of the manipulation of the 16-bit reduced floating point first input data element and the 16-bit reduced floating point second input data element;

outputting the result of the manipulation, wherein the result comprises a single-precision data representation element; and forwarding the result to a next layer of the neural network, based on the outputting;

determining whether the next layer of the neural network is an output layer of the neural network;

in response to a determination that the next layer is not the output layer of the neural network, then defining the second input data element as the result of the manipulation and repeating the accessing, converting, and processing steps with the next layer of the neural network; and in response to a determination that the next layer is the output layer, then outputting the result of the manipulation.

21. A computer system for data manipulation comprising: a memory which stores instructions; and one or more processors attached to the memory wherein the one or more processors, when executing the instructions which are stored, are configured to:

access a first input data element and a second input data element for manipulation on a processor that supports single precision operations, wherein:

the first input data element comprises one or more parameters of a neural network trained on training data represented by a single-precision data representation, wherein each parameter of the neural network comprises a 16-bit reduced floating point representation that does not vary from parameter to parameter of the neural network, and wherein training the neural network using the single-precision training data produces the parameters of the neural network as represented by a 16-bit reduced floating point representation; and the second input data element comprises input data that does not define any parameter of the neural network, for processing by the neural network;

convert the second input data element from a first data representation to a 16-bit reduced floating point representation;

process, by at least a first layer of the neural network, the first and second input data elements, comprising:

manipulating, by the processor, the first input data element with the second input data element, wherein the first input data element comprises a 16-bit reduced floating point representation, to produce a single-precision data output as a result of the manipulation of the 16-bit reduced floating point first input data element and the 16-bit reduced floating point second input data element;

outputting the result of the manipulation, wherein the result comprises a single-precision data representation element; and forwarding the result to a next layer of the neural network, based on the outputting;

determine whether the next layer of the neural network is an output layer of the neural network;

in response to a determination that the next layer is not the output layer of the neural network, then define the second input data element as the result of the manipulation and repeat the accessing, converting, and processing steps with the next layer of the neural network; and in response to a determination that the next layer is the output layer, then output the result of the manipulation.

* * * * *